(12) United States Patent
Dinh et al.

(10) Patent No.: US 11,863,783 B2
(45) Date of Patent: Jan. 2, 2024

(54) ARTIFICIAL INTELLIGENCE-BASED IMAGE ENCODING AND DECODING APPARATUS AND METHOD

(71) Applicant: SAMSUNG ELECTRONICS CO., LTD., Suwon-si (KR)

(72) Inventors: Quockhanh Dinh, Suwon-si (KR); Minwoo Park, Suwon-si (KR); Minsoo Park, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/677,498

(22) Filed: Feb. 22, 2022

(65) Prior Publication Data

US 2022/0272372 A1    Aug. 25, 2022

Related U.S. Application Data

(63) Continuation of application No. PCT/KR2022/002493, filed on Feb. 21, 2022.

(30) Foreign Application Priority Data

Feb. 22, 2021  (KR) .................. 10-2021-0023695
Sep. 15, 2021  (KR) .................. 10-2021-0123369
Dec. 2, 2021   (KR) .................. 10-2021-0171269

(51) Int. Cl.
*H04N 19/51*   (2014.01)
*H04N 19/137*  (2014.01)
(Continued)

(52) U.S. Cl.
CPC .......... *H04N 19/51* (2014.11); *H04N 19/124* (2014.11); *H04N 19/137* (2014.11); *H04N 19/17* (2014.11); *H04N 19/43* (2014.11); *H04N 19/91* (2014.11)

(58) Field of Classification Search
CPC .... H04N 19/124; H04N 19/137; H04N 19/17; H04N 19/43; H04N 19/51; H04N 19/513; H04N 19/537; H04N 19/91
See application file for complete search history.

(56) References Cited

U.S. PATENT DOCUMENTS 10,825,140 B1   11/2020   Yang et al.
10,911,775 B1   2/2021    Zhu et al.
(Continued)

FOREIGN PATENT DOCUMENTS

KR   10-2018-0052651 A   5/2018
KR   10-2020-0016879 A   2/2020
KR   10-2020-0140096 A   12/2020

OTHER PUBLICATIONS

Jianping Lin et al., M-LVC: Multiple Frames Prediction for Learned Video Compression, arXiv:2004.10 290v1, pp. 1-14, April 202.*
(Continued)

*Primary Examiner* — Mohammed S Rahaman
(74) *Attorney, Agent, or Firm* — Sughrue Mion, PLLC

(57) ABSTRACT

A method of reconstructing an optical flow by using artificial intelligence (AI), including obtaining, from a bitstream, feature data of a current residual optical flow for a current image; obtaining the current residual optical flow by applying the feature data of the current residual optical flow to a neural-network-based first decoder; obtaining a current predicted optical flow based on at least one of a previous optical flow, feature data of the previous optical flow, and feature data of a previous residual optical flow; and reconstructing a current optical flow based on the current residual optical flow and the current predicted optical flow.

11 Claims, 22 Drawing Sheets

(51) Int. Cl.
*H04N 19/124* (2014.01)
*H04N 19/43* (2014.01)
*H04N 19/91* (2014.01)
*H04N 19/17* (2014.01)

(56) References Cited

U.S. PATENT DOCUMENTS

| | | | |
|---|---|---|---|
| 11,019,355 B2 | 5/2021 | Cho et al. | |
| 11,196,992 B2 | 12/2021 | Huang et al. | |
| 11,501,532 B2 | 11/2022 | Gan et al. | |
| 11,532,090 B2 | 12/2022 | Chen et al. | |
| 11,610,082 B2 | 3/2023 | Huang et al. | |
| 2019/0246102 A1* | 8/2019 | Cho | G06N 3/045 |
| 2019/0246138 A1 | 8/2019 | Terterov et al. | |
| 2019/0297326 A1 | 9/2019 | Reda et al. | |
| 2020/0053388 A1* | 2/2020 | Schroers | H04N 19/537 |
| 2020/0236349 A1 | 7/2020 | Zhai et al. | |
| 2020/0272903 A1 | 8/2020 | Rippel et al. | |
| 2020/0273185 A1 | 8/2020 | Chen et al. | |
| 2020/0304798 A1* | 9/2020 | Zhao | H04N 19/136 |

OTHER PUBLICATIONS

Eirikur Agustsson et al., "Scale-space flow for end-to-end optimized video compression", Computer Vision Foundation, Jun. 2020, 10 pages total.
Guo Lu et al., "DVC: An End-to-end Deep Video Compression Framework", Computer Vision Foundation, Jun. 2019, 10 pages total.
Communication dated May 30, 2022 issued by the International Searching Authority in counterpart Application No. PCT/KR2022/002486 (PCT/ISA/220, PCT/ISA/210, and PCT/ISA/237).
Communication dated May 26, 2022 issued by the International Searching Authority in counterpart Application No. PCT/KR2022/002493 (PCT/ISA/220, PCT/ISA/210, and PCT/ISA/237).
Jianping Lin et al., "M-LVC: Multiple Frames Prediction for Learned Video Compression", arXiv:2004.10290v1, Apr. 2020, 15 pages total.

* cited by examiner

ARTIFICIAL INTELLIGENCE-BASED IMAGE ENCODING AND DECODING APPARATUS AND METHOD

CROSS-REFERENCE TO RELATED APPLICATIONS

This application is a bypass continuation application of International Application No. PCT/KR2022/002493, filed on Feb. 21, 2022, which claims priority to Korean Patent Application No. 10-2021-0023695, filed on Feb. 22, 2021, and Korean Patent Application No. 10-2021-0123369, filed on Sep. 15, 2021, and Korean Patent Application No. 10-2021-0171269, filed on Dec. 2, 2021, in the Korean Intellectual Property Office, the disclosures of which are incorporated by reference herein in their entireties.

BACKGROUND

1. Field

The disclosure relates to image encoding and decoding. More particularly, the disclosure relates to a technology for encoding and decoding an optical flow required for inter prediction of an image by using artificial intelligence (AI), for example, a neural network, and a technology for encoding and decoding an image.

2. Description of Related Art

Codecs such as H.264 Advanced Video Coding (AVC) and High Efficiency Video Coding (HEVC) may divide an image into blocks and predictively encode and decode each block through inter prediction or intra prediction.

Intra prediction is a method of compressing an image by removing spatial redundancy in the image, and inter prediction is a method of compressing an image by removing temporal redundancy between images.

A representative example of inter prediction is motion estimation coding. Motion estimation coding predicts blocks of a current image by using a reference image. A reference block which is the most similar to a current block may be found in a certain search range by using a certain evaluation function. The current block is predicted based on the reference block, and a residual block is generated and encoded by subtracting, from the current block, a predicted block generated as a prediction result.

To calculate a motion vector indicating the reference block in the reference image, a motion vector of previously encoded blocks may be used as a prediction motion vector of the current block. A differential motion vector corresponding to a difference between a motion vector and the prediction motion vector of the current block is signaled to a decoder in a certain manner.

SUMMARY

Provided are an image encoding and decoding apparatus and method according to an embodiment of the disclosure which may signal an optical flow required for inter prediction at a low bit rate.

Also provided are an image encoding and decoding apparatus and method according to an embodiment of the disclosure which may accurately reconstruct an optical flow.

Also provided are an image encoding and decoding apparatus and method according to an embodiment of the disclosure which may accurately reconstruct an image from a bitstream with a low bit rate.

In accordance with an aspect of the disclosure, a method of reconstructing an optical flow by using artificial intelligence (AI) includes obtaining, from a bitstream, feature data of a current residual optical flow for a current image; obtaining the current residual optical flow by applying the feature data of the current residual optical flow to a neural-network-based first decoder; obtaining a current predicted optical flow based on at least one of a previous optical flow, feature data of the previous optical flow, and feature data of a previous residual optical flow; and reconstructing a current optical flow based on the current residual optical flow and the current predicted optical flow.

An image encoding and decoding apparatus and method according to an embodiment of the disclosure may signal an optical flow required for inter prediction at a low bit rate.

Also, an image encoding and decoding apparatus and method according to an embodiment of the disclosure may accurately reconstruct an optical flow.

Also, an image encoding and decoding apparatus and method according to an embodiment of the disclosure may accurately reconstruct an image from a bitstream with a low bit rate.

DETAILED DESCRIPTION

Figure 1:
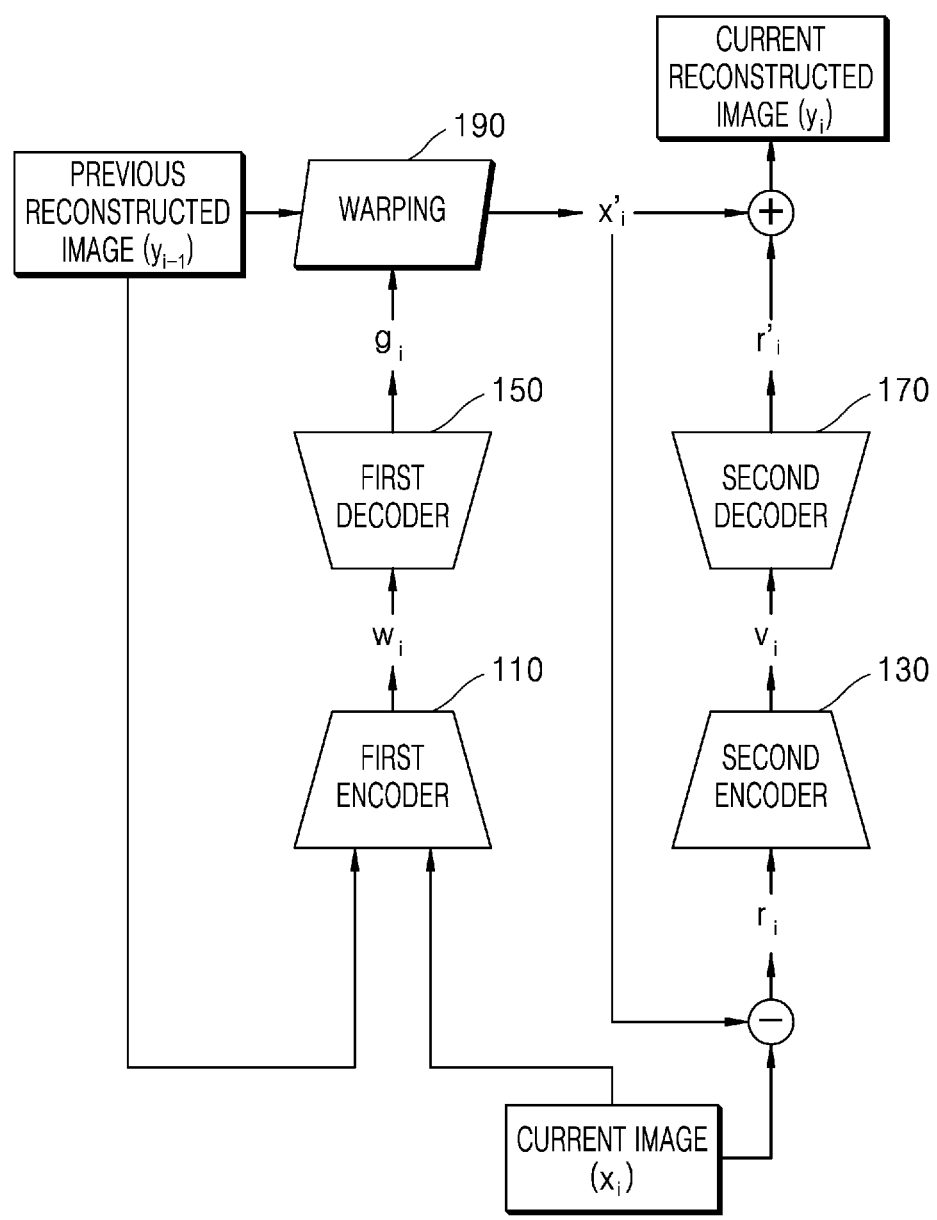
FIG. 1 is a diagram illustrating an artificial intelligence (AI)-based inter prediction process for an image, according to an embodiment.

In accordance with an aspect of the disclosure, a method of reconstructing an optical flow by using artificial intelligence (AI) includes obtaining, from a bitstream, feature data of a current residual optical flow for a current image; obtaining the current residual optical flow by applying the feature data of the current residual optical flow to a neural-network-based first decoder; obtaining a current predicted optical flow based on at least one of a previous optical flow, feature data of the previous optical flow, and feature data of a previous residual optical flow; and reconstructing a current optical flow based on the current residual optical flow and the current predicted optical flow.

The current image may be reconstructed based on current residual image data and a current predicted image generated based on a previous reconstructed image and the reconstructed current optical flow.

The obtaining of the current predicted optical flow may include selecting the previous optical flow as the current predicted optical flow.

The obtaining of the current predicted optical flow may include applying at least one of the previous optical flow, the feature data of the previous optical flow, or the feature data of the previous residual optical flow to a first prediction neural network.

The obtaining of the current predicted optical flow may include: obtaining a second-order optical flow between the current predicted optical flow and the previous optical flow by applying at least one of the previous optical flow, the feature data of the previous optical flow, and the feature data of the previous residual optical flow to a second prediction neural network; and generating the current predicted optical flow by modifying the previous optical flow according to the second-order optical flow.

The obtaining of the current predicted optical flow may include: obtaining, from the bitstream, feature data of a second-order optical flow between the current predicted optical flow and the previous optical flow; obtaining the second-order optical flow by applying the feature data of the second-order optical flow to a neural-network-based third decoder; and generating the current predicted optical flow by modifying the previous optical flow according to the second-order optical flow.

The feature data of the current residual optical flow may be obtained by performing entropy decoding and inverse quantization on the bitstream.

The neural-network-based first decoder may be trained based on: first loss information corresponding to a difference between a current training image and a current reconstructed training image related to the current training image; and second loss information corresponding to entropy of the feature data of the current residual optical flow of the current training image.

The feature data of the current residual optical flow may be obtained from the bitstream based on the current image corresponding to a predictive (P) frame, and based on the P frame following another P frame.

The method may further include obtaining feature data of the current optical flow from the bitstream; and reconstructing the current optical flow by applying the feature data of the current optical flow to a neural-network-based fourth decoder.

In accordance with an aspect of the disclosure, a computer-readable recording medium has recorded thereon instructions which, when executed by at least one processor of a device for reconstructing an optical flow by using artificial intelligence (AI), cause the at least one processor to: obtain, from a bitstream, feature data of a current residual optical flow for a current image; obtain the current residual optical flow by applying the feature data of the current residual optical flow to a neural-network-based first decoder; obtain a current predicted optical flow based on at least one of a previous optical flow, feature data of the previous optical flow, or feature data of a previous residual optical flow; and reconstruct a current optical flow by using the current residual optical flow and the current predicted optical flow.

In accordance with an aspect of the disclosure, an apparatus for reconstructing an optical flow by using artificial intelligence (AI) includes at least one processor configured to implement a bitstream obtainer configured to obtain feature data of a current residual optical flow from a bitstream for a current image; and a prediction decoder configured to: obtain the current residual optical flow by applying the feature data of the current residual optical flow to a neural-network-based first decoder, obtain a current predicted optical flow using at least one of a previous optical flow, feature data of the previous optical flow, and feature data of a previous residual optical flow, and reconstruct a current optical flow based on the current residual optical flow and the current predicted optical flow.

In accordance with an aspect of the disclosure, a method of encoding an optical flow by using artificial intelligence (AI) includes obtaining a current predicted optical flow from at least one of a previous optical flow, feature data of the previous optical flow, and feature data of a previous residual optical flow; obtaining feature data of a current residual optical flow by applying a current image, a previous reconstructed image, and the current predicted optical flow to a neural-network-based first encoder; and generating a bitstream corresponding to the feature data of the current residual optical flow, wherein the current residual optical flow corresponds to a difference between a current optical flow and the current predicted optical flow.

In accordance with an aspect of the disclosure, an apparatus for encoding an optical flow by using artificial intelligence (AI) includes at least one processor configured to implement: a prediction encoder configured to: obtain a current predicted optical flow from at least one of a previous optical flow, feature data of the previous optical flow, and feature data of a previous residual optical flow, and obtain feature data of a current residual optical flow by applying a current image, a previous reconstructed image, and the current predicted optical flow to a neural-network-based first encoder; and a bitstream generator configured to generate a bitstream corresponding to the feature data of the current residual optical flow, wherein the current residual optical flow corresponds to a difference between a current optical flow and the current predicted optical flow.

In accordance with an aspect of the disclosure, a method for reconstructing an optical flow by using artificial intelligence (AI) includes obtaining a current residual optical flow by applying feature data of the current residual optical flow to a neural-network-based first decoder; obtaining a current predicted optical flow based on at least one of a previous optical flow corresponding to a previous reconstructed image, feature data of the previous optical flow, or feature data of a previous residual optical flow corresponding to the previous optical flow; combining the current predicted optical flow with the current residual optical flow to obtain a current optical flow; obtaining a current predicted image by performing motion compensation on the previous reconstructed image based on the current optical flow; and reconstructing a current image based on the current predicted image and current residual image data.

While embodiments of the disclosure are susceptible to various modifications and alternative forms, specific embodiments thereof are shown by way of example in the drawings and will herein be described in detail. It should be understood, however, that there is no intent to limit embodiments of the disclosure to the particular forms disclosed, but conversely, embodiments of the disclosure are to cover all modifications, equivalents, and alternatives falling within the scope of the disclosure.

In the following description of the disclosure, a detailed description of known functions and configurations incorporated herein will be omitted when it may make the subject matter of the disclosure unclear. It will be understood that the terms "first", "second", etc. used herein are only to distinguish one element from another.

It will be also understood that when an element is referred to as being "connected to" another element, it may be "directly connected to" the other element or be "connected to" the other element through an intervening element, unless the context clearly indicates otherwise.

As is traditional in the field, embodiments may be described and illustrated in terms of blocks which carry out a described function or functions. These blocks, as shown in the drawings, which may be referred to herein as "units" or "modules" or the like, or by names such as encoder, decoder, obtainer, quantizer, transformer, subtractor, compensator, changer, or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Two or more elements expressed as "units", "modules", or the like may be combined into one element, or one element may be divided into two or more elements for subdivided functions. Each element described herein may not only perform main functions thereof but also additionally perform some or all functions of other elements, and some main functions of each element may be exclusively performed by another element.

Throughout the disclosure, the expression "at least one of a, b or c" indicates only a, only b, only c, both a and b, both a and c, both b and c, all of a, b, and c, or variations thereof.

As used herein, the term "image" may refer to a still image or a frame, a moving image including a plurality of consecutive still images or frames, or a video.

A "neural network" is a representative example of an artificial neural network model that mimics brain nerves, and is not limited to an artificial neural network model using a specific algorithm. The neural network may also be referred to as a deep neural network.

Also, "parameters" used herein may be values used for calculation at each layer included in the neural network, and may be used, for example, to apply input values to a certain operation formula. The parameters are values set as a result of training, and may be updated based on separate training data when necessary.

Also, "feature data" used herein may refer to data obtained by processing input data by a neural-network-based encoder. The feature data may be 1 or 2-dimensional data including a plurality of samples. The feature data may also be referred to as latent representation. The feature data represents latent features of data output by a decoder described below.

Also, a "current image" used herein may refer to an image to be currently processed, a "current optical flow" may refer to an optical flow obtained for the current image, and "current residual data" may refer to residual data obtained for the current image.

Also, a "previous image" used herein may refer to an image to be processed before the current image, a "previous optical flow" may refer to an optical flow obtained for the previous image, and "previous residual data" may refer to residual data obtained for the previous image.

Also, "samples" used herein may correspond to data assigned to sampling positions in an image, a feature map, or feature data, and refer to data to be processed. For example, the samples may pixels in a 2-dimensional image.

FIG. 1 is a diagram illustrating an artificial intelligence (AI)-based inter prediction process for an image.

FIG. 1 illustrates a process of encoding and decoding a current image $x_i$. In inter prediction, a first encoder 110, a second encoder 130, a first decoder 150, and a second decoder 170 are used. The first encoder 110, the second encoder 130, the first decoder 150, and the second decoder 170 are implemented as neural networks.

Inter prediction is a process of encoding and decoding the current image $x_i$ by using temporal redundancy between the current image $x_i$ and a previous reconstructed image $y_{i-1}$.

Position differences (or motion vectors) between blocks or samples in the current image $x_i$ and reference blocks or reference samples in the previous reconstructed image $y_{i-1}$ are used to encode and decode the current image $x_i$. These position differences may be referred to as an optical flow. The optical flow may be defined as a set of motion vectors corresponding to samples or blocks in an image.

The optical flow represents how positions of samples in the previous reconstructed image $y_{i-1}$ are changed in the current image $x_i$, or where samples of the current image $x_i$ are located in the previous reconstructed image $y_{i-1}$. For example, when a sample located at (1, 1) in the current image $x_i$ is located at (2, 1) in the previous reconstructed image $y_{i-1}$, an optical flow or motion vector of the sample may be derived as (1(=2−1), 0(=1−1)).

In the image encoding and decoding process using AI, the first encoder 110 and the first decoder 150 are used to obtain a current optical flow $g_i$ of the current image $x_i$.

Specifically, the previous reconstructed image $y_{i-1}$ and the current image $x_i$ are input to the first encoder 110. The first encoder 110 outputs feature data $w_i$ of the current optical flow by processing the current image $x_i$ and the previous reconstructed image $y_{i-1}$ based on parameters set as a result of training.

The feature data $w_i$ of the current optical flow represents latent features of the current optical flow.

The feature data $w_i$ of the current optical flow is input to the first decoder 150. The first decoder 150 outputs the current optical flow $g_i$ by processing the input feature data $w_i$ based on parameters set as a result of training.

The previous reconstructed image $y_{i-1}$ is warped, for example by warping 190, according to the current optical flow $g_i$, and a current predicted image $x'_i$ is obtained as the result of the warping 190. The warping 190 is a type of geometric transformation for changing positions of samples in an image. The current predicted image $x'_i$ similar to the current image $x_i$ may be obtained by warping, for example by warping 190, the previous reconstructed image $y_{i-1}$ based on the current optical flow $g_i$ representing relative positions between samples in the previous reconstructed image $y_{i-1}$ and samples in the current image $x_i$. For example, when a sample located at (1, 1) in the previous reconstructed image $y_{i-1}$ is the most similar to a sample located at (2, 1) in the current image $x_i$, the position of the sample located at (1, 1) in the previous reconstructed image $y_{i-1}$ may be changed to (2, 1) through the warping 190.

Because the current predicted image $x'_i$ generated using the previous reconstructed image $y_{i-1}$ is not the current image $x_i$ itself, current residual image data $r_i$ corresponding to a difference between the current predicted image $x'_i$ and the current image $x_i$ may be obtained.

For example, the current residual image data $r_i$ may be obtained by subtracting sample values in the current predicted image $x'_i$ from sample values in the current image $x_i$.

The current residual image data $r_i$ is input to the second encoder 130. The second encoder 130 outputs feature data $v_i$ of the current residual image data by processing the current residual image data $r_i$ according to parameters set as a result of training.

The feature data $v_i$ of the current residual image data is input to the second decoder 170. The second decoder 170 outputs current residual image data $r'_i$ by processing the input feature data $v_i$ according to parameters set as a result of training.

A current reconstructed image $y_i$ is obtained by combining the current residual image data $r'_i$ and the current predicted image $x'_i$ generated by warping the previous reconstructed image $y_{i-1}$, for example by warping 190.

In the inter prediction process of FIG. 1, the feature data $w_i$ of the current optical flow obtained through the first encoder 110 is input to the first decoder 150.

When the process of encoding and decoding the current image $x_i$ is viewed from the viewpoint of an image encoding apparatus, the encoding apparatus should generate a bitstream corresponding to the feature data $w_i$ of the current optical flow in order to signal the feature data $w_i$ of the current optical flow to a decoding apparatus. However, when an object included in the current image xi and the previous image $x_{i-1}$ has a large motion, sizes of sample values included in the current optical flow are large, and thus a bit rate of the bitstream generated based on the feature data $w_i$ representing latent features of the current optical flow may also be increased.

In the following embodiments of the disclosure, a size of a bitstream generated as a result of encoding a current optical flow may be reduced by using a previous optical flow. An example of a correlation between the previous optical flow and the current optical flow will be described with reference to FIG. 2.

Figure 2:
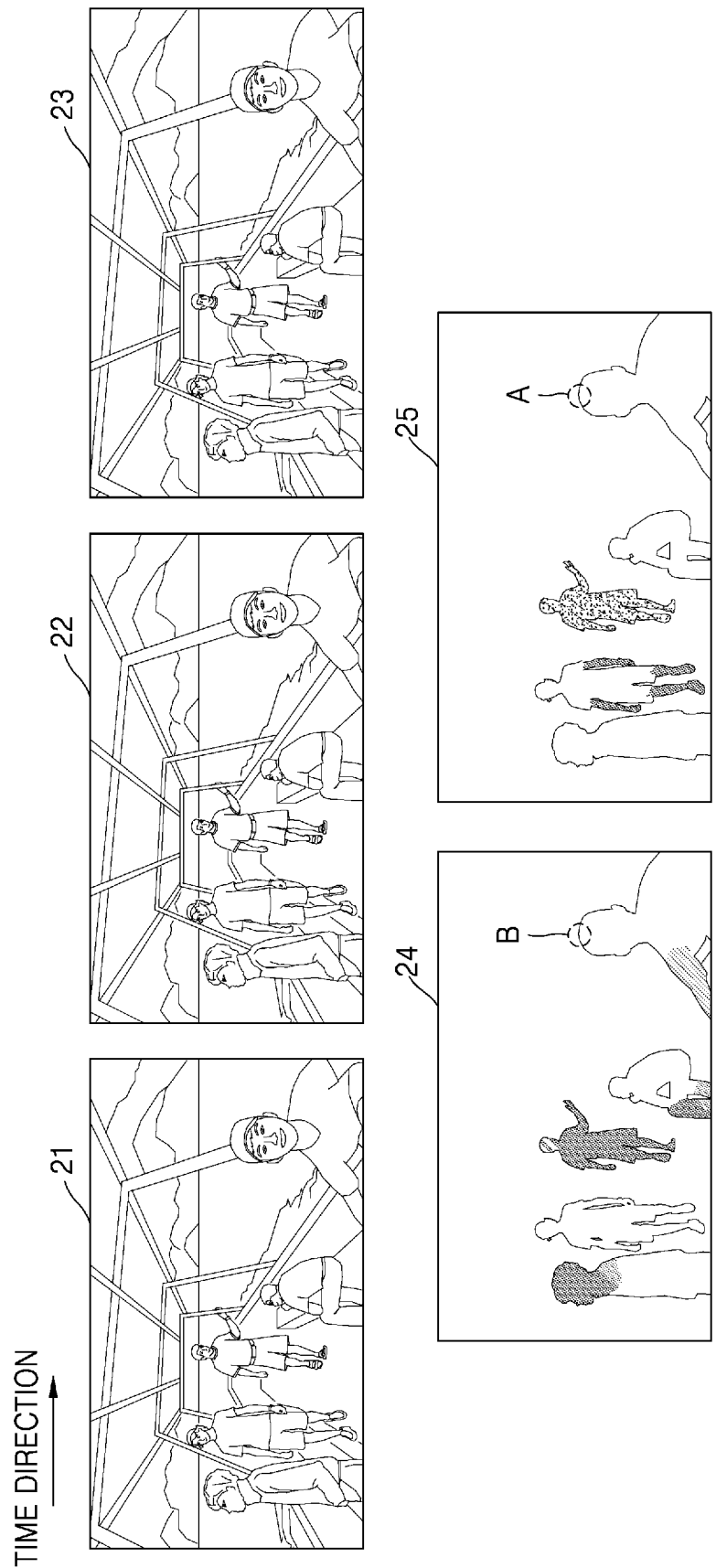
FIG. 2 is a diagram illustrating consecutive images and an optical flow between the consecutive images, according to an embodiment.

Referring to FIG. 2, a first optical flow 25 is obtained between a current image 23 and a first previous image 22, and a second optical flow 24 is obtained between the first previous image 22 and a second previous image 21.

The first optical flow 25 and the second optical flow 24 of FIG. 2 are visualized based on magnitudes of motion vectors or samples included in each optical flow.

The first optical flow 25 may be referred to as a current optical flow, and the second optical flow 24 may be referred to as a previous optical flow.

Referring to FIG. 2, similarity between the first optical flow 25 and the second optical flow 24 may be identified. For example, similarity in sample values of a region A in the first optical flow 25 and a region B in the second optical flow 24 may be identified.

Because an object in temporally consecutive images tends to move linearly, similarity between the first optical flow 25 and the second optical flow 24 may be predicted.

That is, when the previous optical flow (for example the second optical flow 24) is used to encode the current optical flow (for example the first optical flow 25) of the current image 23, a size of a bitstream generated as a result of encoding the current optical flow may be reduced.

Figure 3:
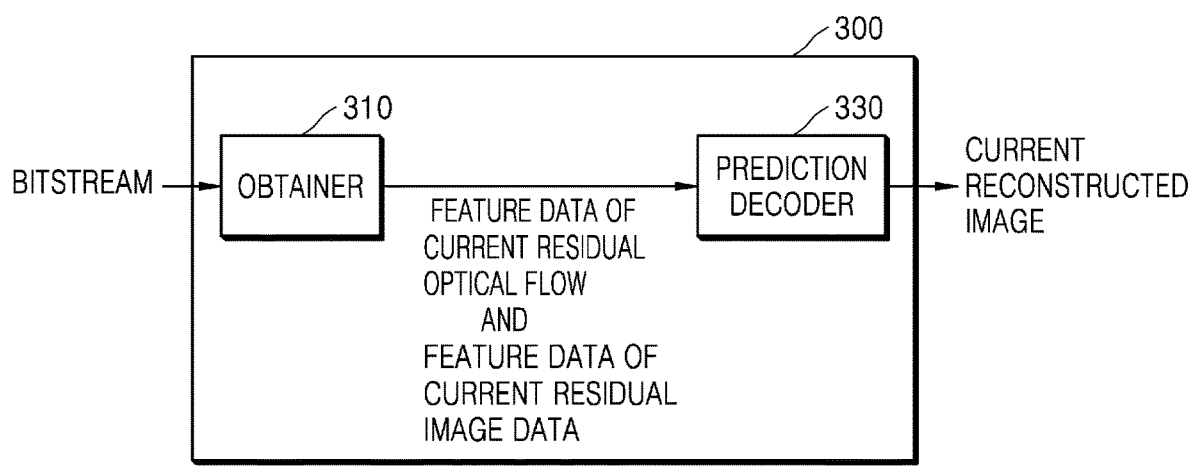
FIG. 3 is a diagram illustrating a configuration of an image decoding apparatus, according to an embodiment.

FIG. 3 is a diagram illustrating a configuration of an image decoding apparatus 300, according to an embodiment of the disclosure.

Referring to FIG. 3, the image decoding apparatus 300 according to an embodiment of the disclosure includes an obtainer 310, which may be for example a bitstream obtainer, and a prediction decoder 330.

The obtainer 310 and the prediction decoder 330 may be implemented as processors, and may operate according to instructions stored in a memory.

Although the obtainer 310 and the prediction decoder 330 are individually illustrated in FIG. 3, in embodiments the obtainer 310 and the prediction decoder 330 may be implemented as one element, for example one processor. In this case, the obtainer 310 and the prediction decoder 330 may be implemented as a dedicated processor, or a combination of software and a general-purpose processor such as an application processor (AP), a central processing unit (CPU), or a graphics processing unit (GPU). The dedicated processor may include a memory for implementing an embodiment of the disclosure, or may include a memory processor for using an external memory.

In embodiments, the obtainer 310 and the prediction decoder 330 may be implemented as a plurality of processors. In this case, the obtainer 310 and the prediction decoder 330 may be implemented as a combination of dedicated processors, or a combination of software and general-purpose processors such as APs, CPUs, or GPUs.

The obtainer 310 obtains a bitstream including a result of encoding a current image.

The obtainer 310 may receive a bitstream transmitted through a network from an image encoding apparatus 1200 described below. In an embodiment of the disclosure, the obtainer 310 may obtain a bitstream from a data storage medium including a magnetic medium (e.g., a hard disk, a floppy disk, or a magnetic tape), an optical medium (e.g., a compact disc read-only memory (CD-ROM) or a digital versatile disc (DVD)), or a magneto-optical medium (e.g., a floptical disk).

The obtainer 310 obtains feature data of a current residual optical flow and feature data of current residual image data by parsing the bitstream.

The current residual optical flow corresponds to a difference between a current predicted optical flow, which is predicted from a previous optical flow, and a current optical flow. The current residual image data corresponds to a difference between a current predicted image, which is predicted from a previous reconstructed image, and the current image.

The feature data of the current residual optical flow and the feature data of the current residual image data may be obtained as a result of processing by a neural network-based encoder.

In an embodiment of the disclosure, the obtainer 310 may obtain a first bitstream corresponding to the feature data of the current residual optical flow and a second bitstream corresponding to the feature data of the current residual image data, and may obtain the feature data of the current residual optical flow and the feature data of the current residual image data by parsing the first bitstream and the second bitstream, respectively.

The feature data of the current residual optical flow and the feature data of the current residual image data are transmitted to the prediction decoder 330, and the prediction decoder 330 obtains a current reconstructed image corresponding to the current image, by using the feature data of the current residual optical flow and the feature data of the current residual image data.

According to an implementation example, in embodiments the feature data of the current residual image data may be not included in the bitstream. The obtainer 310 may obtain the feature data of the current residual optical flow from the bitstream, and the prediction decoder 330 may reconstruct the current optical flow. In this case, the image decoding apparatus 300 may be referred to as an optical flow decoding apparatus.

The current optical flow reconstructed by the prediction decoder 330 may be transmitted to another device, and the current reconstructed image may be generated based on the current optical flow by the other device.

In detail, the other device may generate the current reconstructed image by combining the current residual image data obtained from the bitstream with the current predicted image generated from the previous reconstructed image according to the current optical flow.

Examples of operations of the obtainer 310 and the prediction decoder 330 will now be described in detail with reference to FIGS. 4 and 5.

Figure 4:
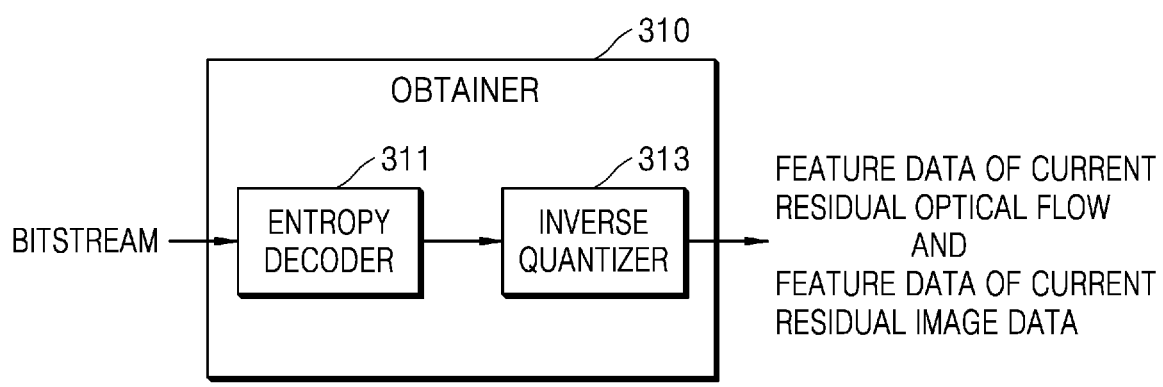
FIG. 4 is a diagram illustrating a configuration of an obtainer of FIG. 3, according to an embodiment.

FIG. 4 is a diagram illustrating a configuration of the obtainer 310 of FIG. 3.

Referring to FIG. 4, the obtainer 310 includes an entropy decoder 311 and an inverse quantizer 313.

The entropy decoder 311 obtains quantized feature data of a current residual optical flow and quantized feature data of current residual image data by entropy-coding bins included in a bitstream.

The inverse quantizer 313 obtains feature data of the current residual optical flow and feature data of the current residual image data by inversely quantizing the quantized feature data of the current residual optical flow and the quantized feature data of the current residual image data.

According to an implementation example, in embodiments the obtainer 310 may further include an inverse transformer. The inverse transformer inversely transforms the feature data output from the inverse quantizer 313, from a frequency domain into a spatial domain. When the image encoding apparatus 1200 described blow transforms the feature data of the current residual optical flow and the feature data of the current residual image data from a spatial domain into a frequency domain, the inverse transformer may inversely transform the feature data output from the inverse quantizer 313 from the frequency domain into the spatial domain.

Also, according to an implementation example, in embodiments the obtainer 310 may not include the inverse quantizer 313. That is, the feature data of the current residual optical flow and the feature data of the current residual image data may be obtained through processing by the entropy decoder 311.

Also, according to an implementation example, in embodiments the obtainer 310 may obtain the feature data of the current residual optical flow and the feature data of the current residual image data only by inversely binarizing the bins included in the bitstream. This may be performed for a case in which the image encoding apparatus 1200 generates the bitstream by binarizing the feature data of the current residual optical flow and the feature data of the current residual image data, in other words, a case in which the image encoding apparatus 1200 does not apply entropy quantization, transformation, and quantization, to the feature data of the current residual optical flow and the feature data of the current residual image data.

Figure 5:
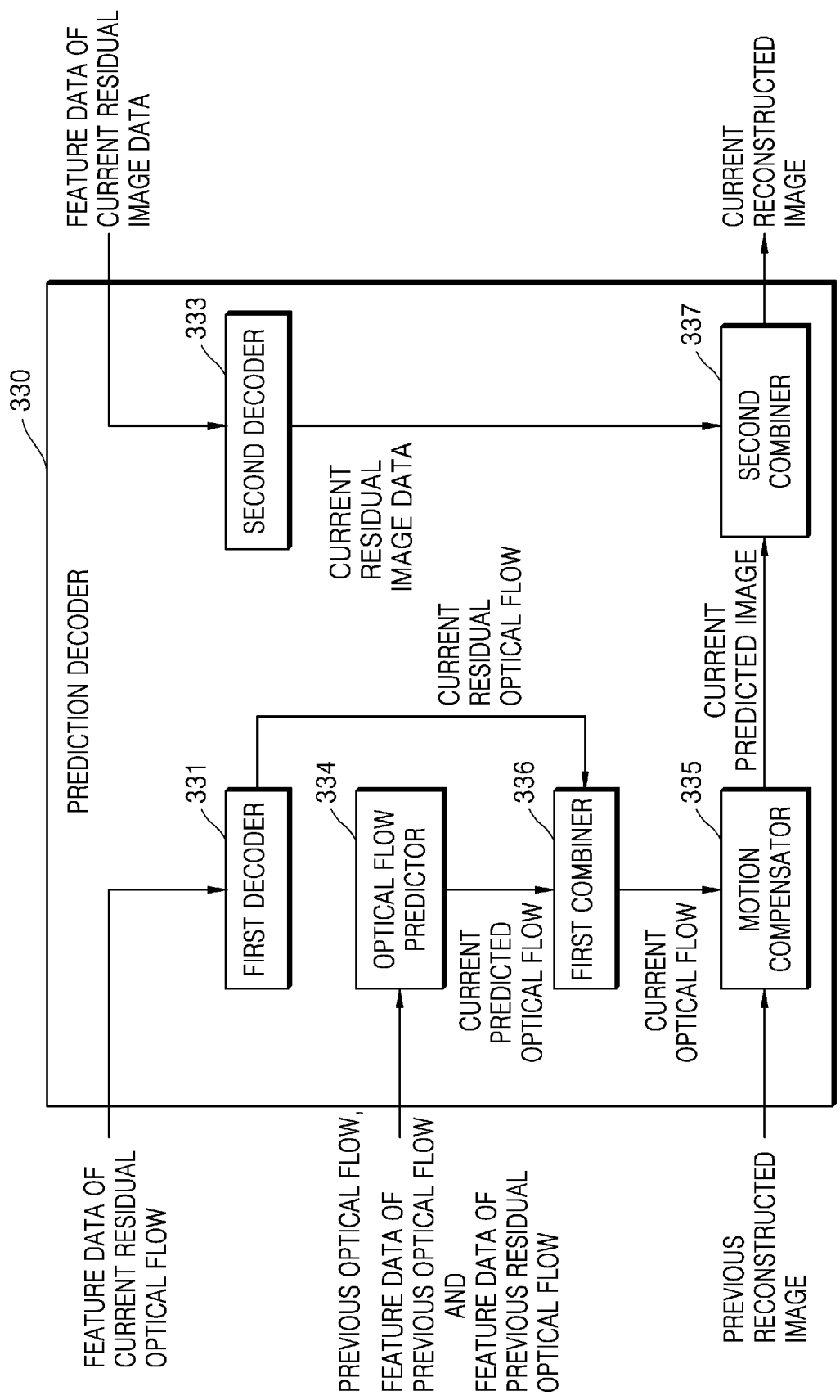
FIG. 5 is a diagram illustrating a configuration of a prediction decoder of FIG. 3, according to an embodiment.

FIG. 5 is a diagram illustrating a configuration of the prediction decoder 330 of FIG. 3.

Referring to FIG. 3, the prediction decoder 330 may include a first decoder 331, a second decoder 333, an optical flow predictor 334, a first combiner 336, a motion compensator 335, and a second combiner 337.

The first decoder 331 and the second decoder 333 may be stored in a memory. In an embodiment of the disclosure, the first decoder 331 and the second decoder 333 may be implemented as at least one dedicated processor for AI.

Feature data of a current residual optical flow output from the obtainer 310 is input to the first decoder 331, and feature data of current residual image data is input to the second decoder 333.

According to an implementation example, for accurate reconstruction of the current residual image data, in embodiments the feature data of the current residual optical flow or feature data of a current optical flow may be concatenated with the feature data of the current residual image data and then may be input to the second decoder 333. The concatenation may refer to a process of combining two or more pieces of feature data in a channel direction.

The first decoder 331 obtains the current residual optical flow by processing the feature data of the current residual optical flow according to parameters set through training. The current residual optical flow that is 1 or 2-dimensional data may include a plurality of samples.

The second decoder 333 obtains the current residual image data by processing the feature data of the current residual image data according to parameters set through training. The current residual image data that is 1 or 2-dimensional data may include a plurality of samples.

The optical flow predictor 334 obtains a current predicted optical flow by using at least one of a previous optical flow, feature data of the previous optical flow, or feature data of a previous residual optical flow.

The current predicted optical flow that is 1 or 2-dimensional data may include a plurality of samples.

In an embodiment of the disclosure, the optical flow predictor 334 may determine or select the previous optical flow as the current predicted optical flow.

As described with reference to FIG. 2, because an object in consecutive images tends to move linearly, the previous optical flow may be likely to be very similar to the current optical flow. Accordingly, when the previous optical flow is determined as the current predicted optical flow, sizes of sample values of the current residual optical flow and sizes of sample values of the feature data of the current residual optical flow may be reduced.

The current predicted optical flow obtained by the optical flow predictor 334 and the current residual optical flow obtained through the first decoder 331 are provided to the first combiner 336.

The first combiner 336 reconstructs the current optical flow by combining the current predicted optical flow with the current residual optical flow. The first combiner 336 may reconstruct the current optical flow by combining sample values of the current predicted optical flow with the sample values of the current residual optical flow.

The motion compensator 335 generates a current predicted image similar to a current image by processing a previous reconstructed image according to the current optical flow. The previous reconstructed image is an image reconstructed by decoding a previous image to be processed before the current image is processed.

The motion compensator 335 may warp the previous reconstructed image according to the current optical flow to generate the current predicted image. The warping for generating the current predicted image is merely an example, and the motion compensator 335 may apply various types of image processing for changing positions of samples in the previous reconstructed image in order to generate the previous reconstructed image, to generate the current predicted image similar to the current image.

The current predicted image generated by the motion compensator 335 is provided to the second combiner 337.

The second combiner 337 obtains a current reconstructed image by combining the current predicted image with the current residual image data. In an example, the second combiner 337 may obtain the current reconstructed image including values obtained by summing sample values of the current predicted image and sample values of the current residual image data.

The current reconstructed image and the current optical flow may be used in a next image decoding process.

According to an implementation example, in embodiments the prediction decoder 330 may reconstruct the current optical flow from the feature data of the current residual optical flow, and may provide the reconstructed current optical flow to another device. In this case, the second decoder 333, the motion compensator 335, and the second combiner 337 may be not included in the prediction decoder 330.

According to an implementation example, when the current residual image data is obtainable from a bitstream, in embodiments the second decoder 333 may be not included in the prediction decoder 330. That is, the prediction decoder 330 may generate the current reconstructed image by combining the current residual image data obtained from the bitstream with the current predicted image.

According to an embodiment of the disclosure, because the bitstream is generated based on the current residual optical flow including samples having sizes less than those of the current optical flow, a lower bit rate may be achieved than when the bitstream is generated from the current optical flow.

Although in embodiments corresponding to FIG. 5 the optical flow predictor 334 determines the previous optical flow as the current predicted optical flow, an example of an operation of the optical flow predictor 334 according to another embodiment of the disclosure will be described with reference to FIGS. 6 through 8.

Figure 6:
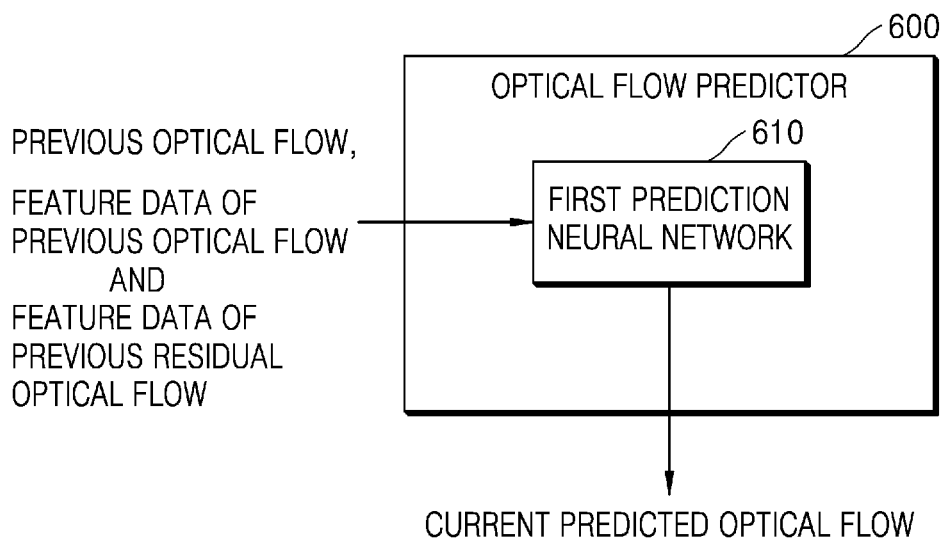
FIG. 6 is a diagram illustrating a configuration of an optical flow predictor, according to an embodiment.

FIG. 6 is a diagram illustrating a configuration of an optical flow predictor 600, according to an embodiment of the disclosure.

Referring to FIG. 6, the optical flow predictor 600 includes a first prediction neural network 610. The first prediction neural network 610 may be stored in a memory. In an embodiment of the disclosure, the first prediction neural network 610 may be implemented as at least one dedicated processor for AI.

At least one of a previous optical flow, feature data of the previous optical flow, or feature data of a previous residual optical flow is input to the first prediction neural network 610, to obtain a current predicted optical flow.

The feature data of the previous optical flow represents latent features of the previous optical flow used during a process of reconstructing a previous image.

In an embodiment of the disclosure, the feature data of the previous optical flow may be obtained in a process of reconstructing the previous optical flow when the previous image is a predictive (P) frame after an intra (I) frame. The I frame and the P frame will be described below.

In another embodiment of the disclosure, the prediction decoder 330 may reconstruct the previous optical flow, and then may obtain the feature data of the previous optical flow by applying the reconstructed previous optical flow to a neural network.

The first prediction neural network 610 obtains the current predicted optical flow by processing at least one of the previous optical flow, the feature data of the previous optical flow, or the feature data of the previous residual optical flow according to parameters set through training.

As described with reference to FIG. 5, when the current predicted optical flow and a current residual optical flow are combined with each other, a current optical flow used to generate a current predicted image is obtained. As described below with reference to FIGS. 20 and 21, the first prediction neural network 610 may be trained together with the a first encoder 1211, a second encoder 1215, the first decoder 331, and the second decoder 333, through sharing of loss information, in other words, with a common purpose.

Because data output from the first prediction neural network 610 is combined with the current residual optical flow output by the first decoder 331 and then is used to generate the current predicted image, the first prediction neural network 610 may be trained to output a difference between the current optical flow and the current residual optical flow, that is, the current predicted optical flow.

Figure 7:
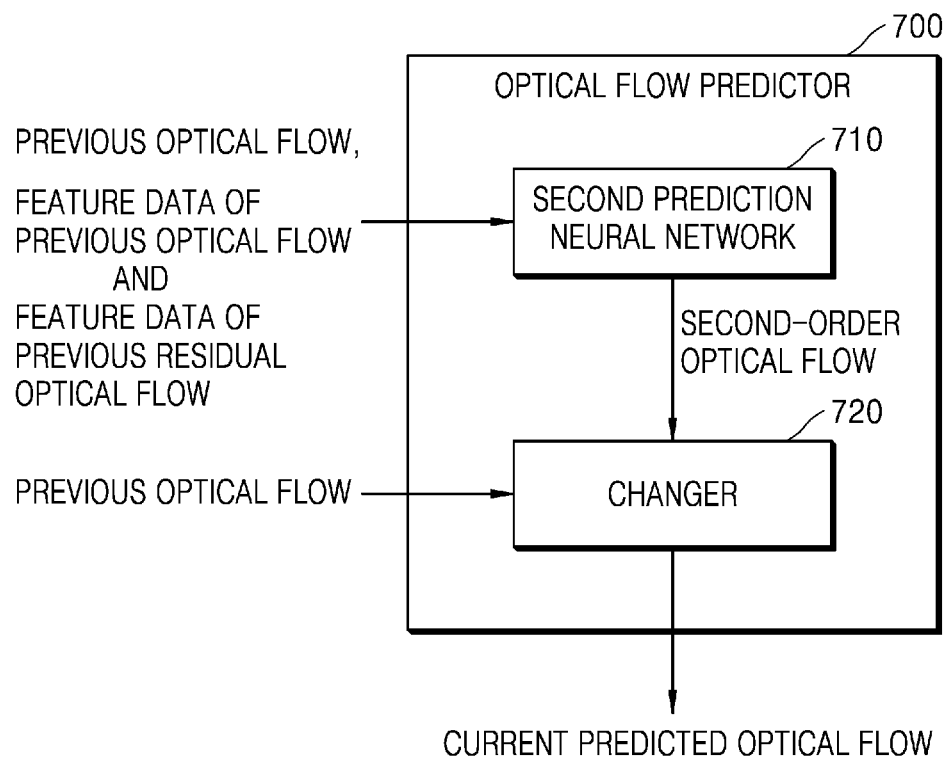
FIG. 7 is a diagram illustrating a configuration of an optical flow predictor, according to an embodiment.

FIG. 7 is a diagram illustrating a configuration of an optical flow predictor 700, according to another embodiment of the disclosure.

Referring to FIG. 7, the optical flow predictor 700 includes a second prediction neural network 710 and a changer 720.

The second prediction neural network 710 may be stored in a memory. In an embodiment of the disclosure, the second prediction neural network 710 may be implemented as at least one dedicated processor for AI.

At least one of a previous optical flow, feature data of the previous optical flow, or feature data of a previous residual optical flow is input to the second prediction neural network 710.

The second prediction neural network 710 obtains a second-order optical flow between a current predicted optical flow and the previous optical flow according to parameters set through training.

The second-order optical flow, which may be an optical flow between optical flows, may be defined or expressed as a set of motion vectors corresponding to samples or blocks in the optical flow.

The second-order optical flow may represent how positions of samples in the previous optical flow are changed in the current predicted optical flow or where reference samples of samples of the current predicted optical flow are located in the previous optical flow. For example, when a sample located at (1, 1) in the previous optical flow is located at (2, 1) in the current predicted optical flow, a second-order optical flow or motion vector of the sample may be derived as (1(=2−1), 0(=1−1)).

The changer 720, which may be for example an optical flow modifier or an optical flow processor, obtains the current predicted optical flow by processing the previous optical flow according to the second-order optical flow.

An operation of the changer 720 is similar to an operation of the motion compensator 335 of FIG. 5. That is, the motion compensator 335 may obtain a current predicted image by warping a previous reconstructed image according to a current optical flow, and the changer 720 may obtain the current predicted optical flow by warping the previous optical flow according to the second-order optical flow.

The warping for generating the current predicted optical flow is merely an example, and the changer 720 may apply various types of processing for changing positions of samples in the previous optical flow to the previous optical flow in order to generate the current predicted optical flow similar to the current optical flow.

Because data output from the second prediction neural network 710 is used to change positions of samples in the previous optical flow, the second prediction neural network 710 may output data for changing the previous optical flow into the current predicted optical flow, that is, the second-order optical flow, through training of the second prediction neural network 710 based on loss information.

Figure 8:
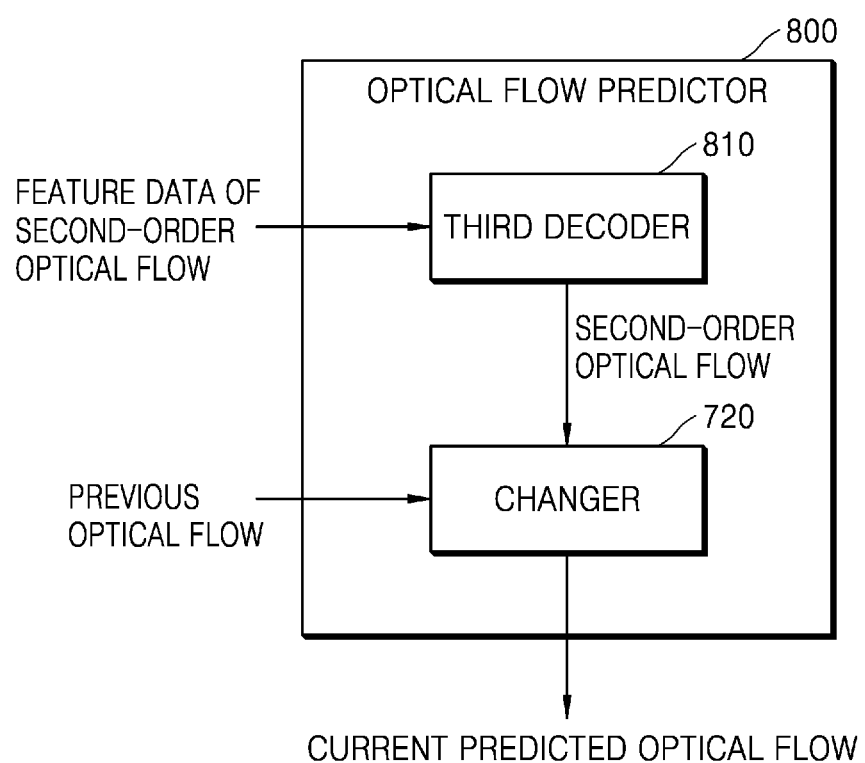
FIG. 8 is a diagram illustrating a configuration of an optical flow predictor, according to an embodiment.

FIG. 8 is a diagram illustrating a configuration of an optical flow predictor 800, according to another embodiment of the disclosure.

Referring to FIG. 8, the optical flow predictor 800 includes a third decoder 810 and the changer 720. The third decoder 810 may be stored in a memory. In an embodiment of the disclosure, the third decoder 810 may be implemented as at least one dedicated processor for AI.

The third decoder 810 obtains a second-order optical flow by processing feature data of the second-order optical flow according to parameters set through training.

The feature data of the second-order optical flow may be obtained from a bitstream. The obtainer 310 may obtain the feature data of the second-order optical flow from the bitstream and may provide the feature data of the second-order optical flow to the prediction decoder 330.

The image encoding apparatus 1200 may generate the bitstream including feature data of a current residual optical flow and feature data of current residual image data. According to an implementation example, in embodiments the image encoding apparatus 1200 may generate the bitstream further including the feature data of the second-order optical flow, an example of which will be described below with reference to FIG. 14.

The changer 720 may obtain a current predicted optical flow by processing a previous optical flow according to the second-order optical flow.

In an embodiment of the disclosure, the changer 720 may warp the previous optical flow according to the second-order optical flow in order to obtain the current predicted optical flow. The warping for generating the current predicted optical flow is merely an example, and the changer 720 may apply various types of processing for changing positions of samples in the previous optical flow according to the second-order optical flow to the previous optical flow.

In an embodiment according to FIG. 8, the feature data of the second-order optical flow provided from the image encoding apparatus 1200 is input to and processed by the third decoder 810. Accordingly, the complexity of the third decoder 810 may be reduced when compared to the first prediction neural network 610 and the second prediction neural network 710 that receive and process at least one of the previous optical flow, feature data of the previous optical flow, or feature data of a previous residual optical flow. This is because the third decoder 810 processes the feature data of the second-order optical flow representing features of the second-order optical flow itself, whereas the first prediction neural network 610 and the second prediction neural network 710 process the previous optical flow, the feature data of the previous optical flow, and/or the feature data of the previous residual optical flow, which may have relatively low relevance to the current predicted optical flow and the second-order optical flow.

Figure 9:
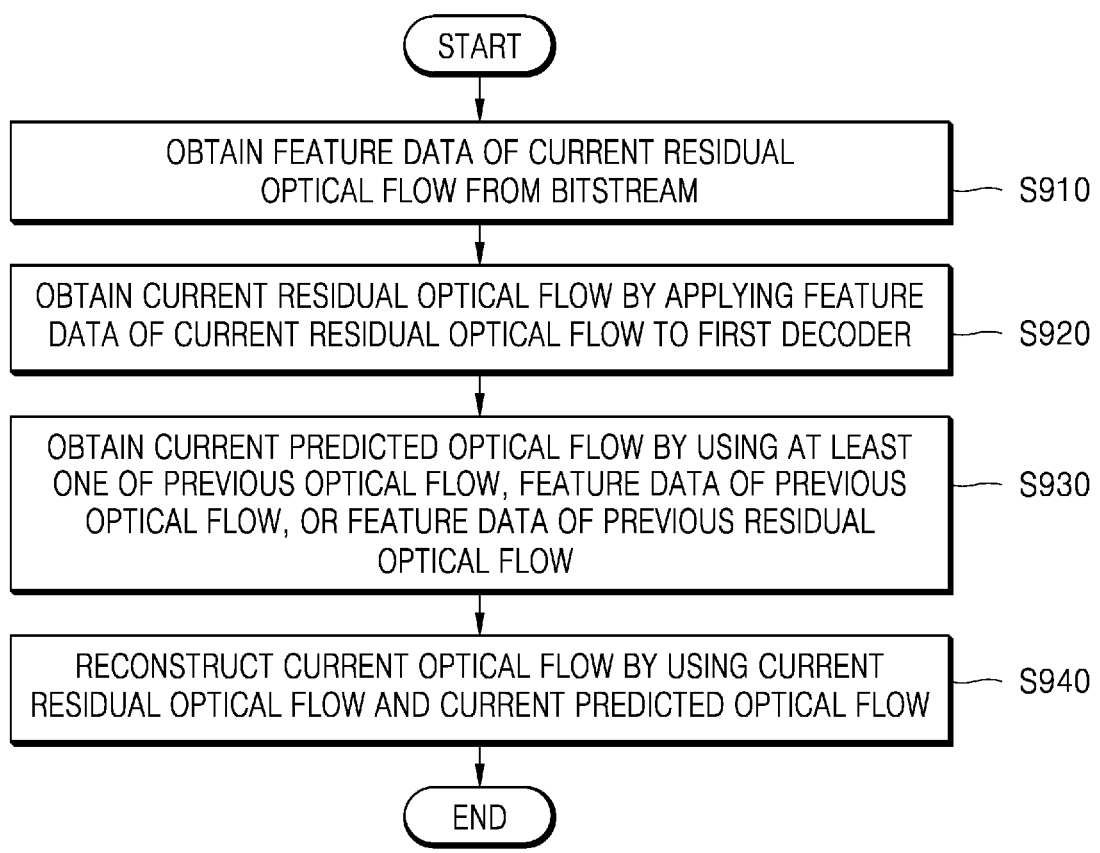
FIG. 9 is a flowchart illustrating a method of reconstructing an optical flow, according to an embodiment.

FIG. 9 is a flowchart illustrating a method of reconstructing an optical flow, according to an embodiment of the disclosure.

In operation S910, the image decoding apparatus 300 obtains feature data of a current residual optical flow from a bitstream for a current image.

The image decoding apparatus 300 may obtain the feature data of the current residual optical flow by applying at least one of inverse binarization, entropy decoding, inverse quantization, or inverse transformation to bins included in the bitstream.

In operation S920, the image decoding apparatus 300 obtains the current residual optical flow by applying the feature data of the current residual optical flow to a neural network based first decoder.

In operation S930, the image decoding apparatus 300 obtains a current predicted optical flow by using at least one of a previous optical flow, feature data of the previous optical flow, or feature data of a previous residual optical flow.

In an embodiment of the disclosure, the image decoding apparatus 300 may determine the previous optical flow as the current predicted optical flow.

In another embodiment of the disclosure, the image decoding apparatus 300 may obtain the current predicted optical flow by applying at least one of the previous optical flow, the feature data of the previous optical flow, or the feature data of the previous residual optical flow to the first prediction neural network 610.

In another embodiment of the disclosure, the image decoding apparatus 300 may obtain a second-order optical flow by applying at least one of the previous optical flow, the feature data of the previous optical flow, or the feature data of the previous residual optical flow to the second prediction neural network 710, and may obtain the current predicted optical flow by processing the previous optical flow according to the second-order optical flow.

In another embodiment of the disclosure, the image decoding apparatus 300 may obtain the second-order optical flow by applying feature data of the second-order optical flow obtained from the bitstream to the third decoder 810, and may obtain the current predicted optical flow by processing the previous optical flow according to the second-order optical flow.

In operation S940, the image decoding apparatus 300 reconstructs a current optical flow by using the current residual optical flow and the current predicted optical flow. The image decoding apparatus 300 may obtain the current optical flow by summing sample values of the current residual optical flow and sample values of the current predicted optical flow.

In an embodiment of the disclosure, the image decoding apparatus 300 may obtain feature data of current residual image data from the bitstream, and may obtain the current residual image data by applying the feature data of the current residual image data to the second decoder 333. The image decoding apparatus 300 may obtain a current predicted image by processing a previous reconstructed image according to the current optical flow, and may obtain a current reconstructed image by combining the current predicted image with the current residual image data.

In another embodiment of the disclosure, the image decoding apparatus 300 may obtain the current residual image data from the bitstream. The image decoding apparatus 300 may obtain the current predicted image by processing the previous reconstructed image according to the current optical flow, and may obtain the current reconstructed image by combining the current predicted image with the current residual image data.

In another embodiment of the disclosure, the image decoding apparatus 300 may provide the current optical flow to another device so that the other device obtains the current reconstructed image.

An example of an inter prediction process described with reference to FIGS. 3 through 9 considers a case in which a previous image is processed through inter prediction. This is because a previous optical flow used to reconstruct a current optical flow is generated in an inter prediction process of the previous image.

That is, an inter prediction process described with reference to FIGS. 3 through 9 may be applied when a current image corresponds to a predictive (P) frame after a P frame, in other words, when a previous image is a P frame and a current image is a P frame. The term "P frame" refers to an image or a frame that may be reconstructed through intra prediction or inter prediction. An image or a frame that may be reconstructed only through intra prediction is referred to as an intra (I) frame.

Accordingly, when a previous image is an I frame, a previous optical flow is not obtained. Accordingly, an example of an inter prediction process for a case in which a current image is a P frame after an I frame, in other words, a case in which a previous image is an I frame and a current image is a P frame, is described below.

Figure 10:
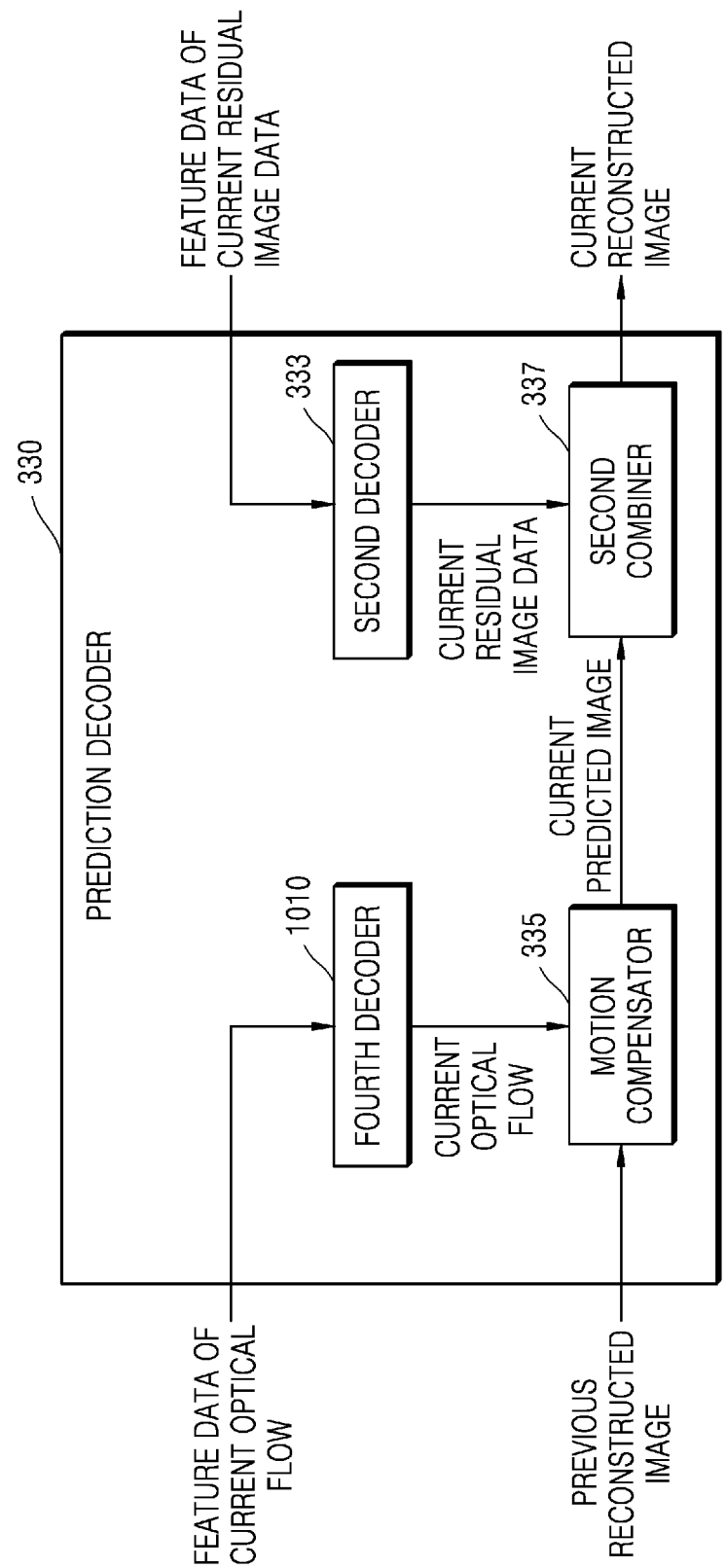
FIG. 10 is a diagram illustrating another configuration of a prediction decoder.

FIG. 10 is a diagram illustrating another configuration of the prediction decoder 330.

Referring to FIG. 10, the prediction decoder 330 includes a fourth decoder 1010, the second decoder 333, the motion compensator 335, and the second combiner 337.

The fourth decoder 1010 may be stored in a memory. In an embodiment of the disclosure, the fourth decoder 1010 may be implemented as at least one dedicated processor for AI.

The fourth decoder 1010 obtains a current optical flow by processing feature data of the current optical flow according to parameters set through training.

The feature data of the current optical flow may be obtained from a bitstream. That is, the obtainer 310 may obtain the feature data of the current optical flow by applying at least one of inverse binarization, entropy decoding, inverse quantization, or inverse transformation to bins included in the bitstream.

The second decoder 333 obtains current residual image data by processing feature data of the current residual image data according to parameters set through training.

The motion compensator 335 obtains a current predicted image by processing a previous reconstructed image according to the current optical flow, and the second combiner 337 obtains a current reconstructed image by combining the current predicted image with the current residual image data.

According to an implementation example, in embodiments the prediction decoder 330 may transmit the current optical flow to another device, so that the other device obtains the current reconstructed image. In this case, the second decoder 333, the motion compensator 335, and the second combiner 337 may be not included in the prediction decoder 330.

In embodiments the prediction decoder 330 may further include a determiner configured to determine whether a current image is a P frame after an I frame or a P frame after a P frame.

In embodiments, when the current image is a P frame after a P frame, the prediction decoder 330 may reconstruct the current optical flow through the first decoder 331, the optical flow predictor 334, and the first combiner 336 of FIG. 5, and, when the current image is a P frame after an I frame, the prediction decoder 330 may reconstruct the current optical flow through the fourth decoder 1010 of FIG. 10.

Figure 11:
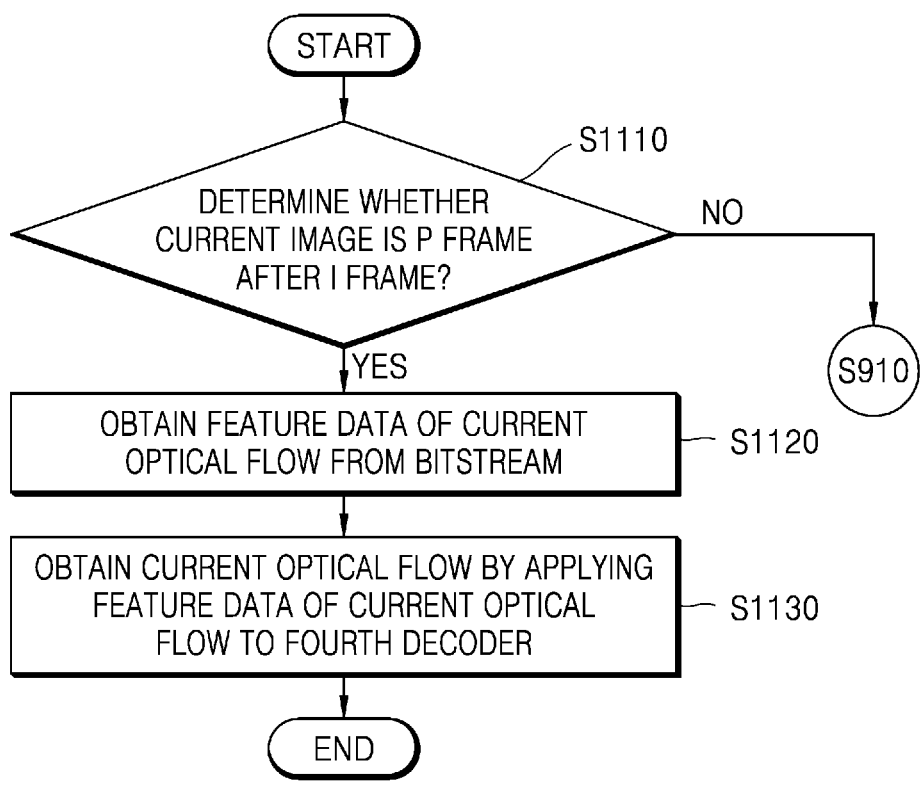
FIG. 11 is a flowchart illustrating a method of reconstructing an optical flow, according to an embodiment.

FIG. 11 is a flowchart illustrating a method of reconstructing an optical flow, according to another embodiment of the disclosure.

In operation S1110, the image decoding apparatus 300 determines whether a current image is a P frame after an I frame.

When the current image is a P frame after an I frame, in operation S1120, the image decoding apparatus 300 obtains feature data of a current optical flow from a bitstream.

The image decoding apparatus 300 may obtain the feature data of the current optical flow by applying at least one of inverse binarization, entropy decoding, inverse quantization, or inverse transformation to bins included in the bitstream.

In operation S1130, the image decoding apparatus 300 obtains the current optical flow by applying the feature data of the current optical flow to the fourth decoder 1010.

When the current image is not a P frame after an I frame, in other words, when the current image is a P frame after a P frame, the image decoding apparatus 300 may reconstruct the current optical flow through operations S910 through S940 of FIG. 9.

An example of an operation of the image encoding apparatus 1200 will now be described with reference to FIGS. 12 through 15.

Figure 12:
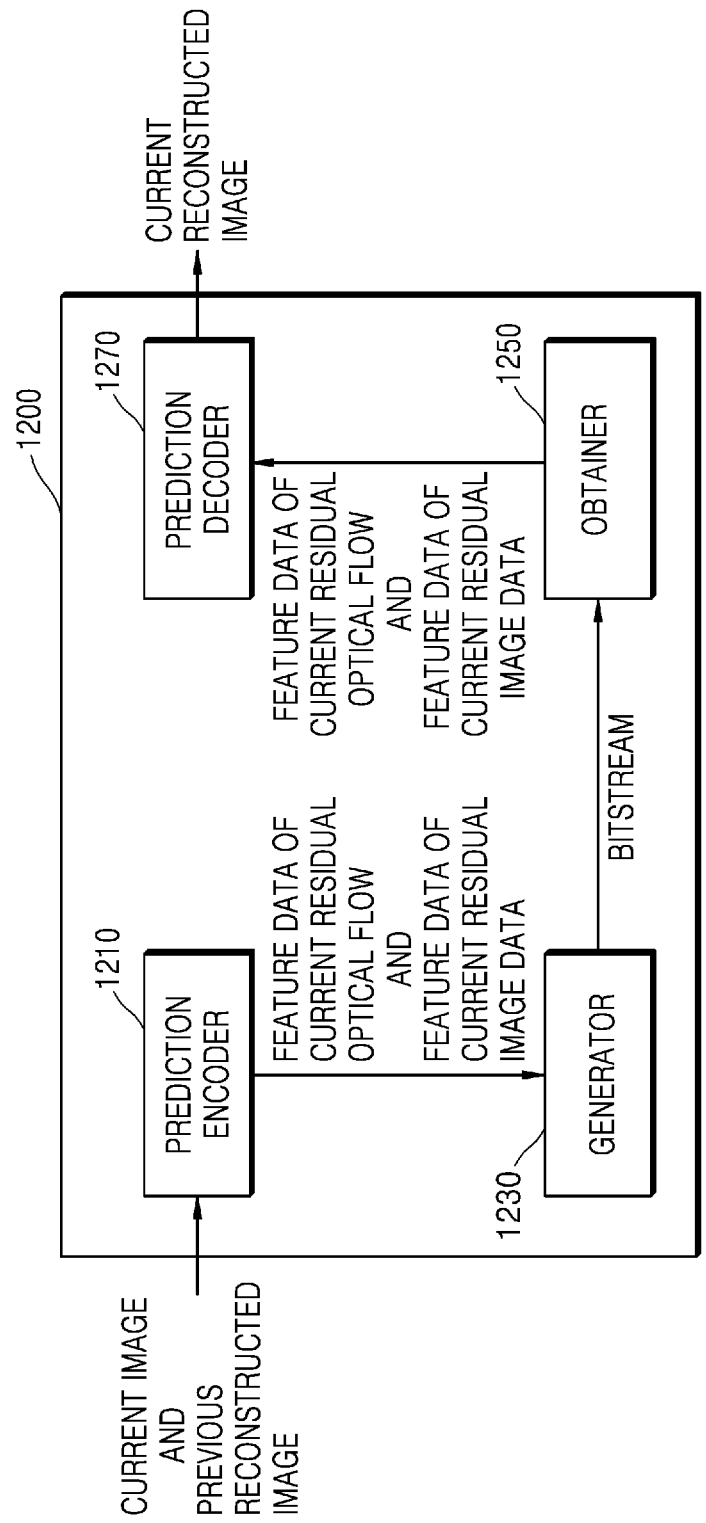
FIG. 12 is a diagram illustrating a configuration of an image encoding apparatus, according to an embodiment.

FIG. 12 is a diagram illustrating a configuration of the image encoding apparatus 1200, according to an embodiment of the disclosure.

Referring to FIG. 12, the image encoding apparatus 1200 includes a prediction encoder 1210, a generator 1230, an obtainer 1250, and a prediction decoder 1270.

The prediction encoder 1210, the generator 1230, the obtainer 1250, and the prediction decoder 1270 may be implemented as processors, and the prediction encoder 1210, the generator 1230, the obtainer 1250, and the prediction decoder 1270 may operate according to instructions stored in a memory.

Although the prediction encoder 1210, the generator 1230, the obtainer 1250, and the prediction decoder 1270 are individually illustrated in FIG. 12, in embodiments the prediction encoder 1210, the generator 1230, the obtainer 1250, and the prediction decoder 1270 may be implemented as one element, for example one processor. In this case, the prediction encoder 1210, the generator 1230, the obtainer 1250, and the prediction decoder 1270 may be implemented as a dedicated processor, or a combination of software and a general-purpose processor such as an AP, a CPU, or a GPU. Also, the dedicated processor may include a memory for implementing an embodiment of the disclosure, or may include a memory processor for using an external memory.

The prediction encoder 1210, the generator 1230, the obtainer 1250, and the prediction decoder 1270 may be implemented as a plurality of processors. In this case, the prediction encoder 1210, the generator 1230, the obtainer 1250, and the prediction decoder 1270 may be implemented as a combination of dedicated processors, or a combination of software and general-purpose processors such as APs, CPUs, or GPUs.

The prediction encoder 1210 obtains feature data of a current residual optical flow and feature data of current residual image data by using a current image and a previous reconstructed image.

The prediction encoder 1210 may use a neural network based first encoder 1211 and a neural network based second encoder 1215 in order to obtain the feature data of the current residual optical flow and the feature data of the current residual image data.

The feature data of the current residual optical flow and the feature data of the current residual image data obtained by the prediction encoder 1210 are transmitted to the generator 1230, which may be for example a bitstream generator.

The generator 1230 generates a bitstream from the feature data of the current residual optical flow and the feature data of the current residual image data. In an embodiment of the disclosure, the generator 1230 may generate a first bitstream corresponding to the feature data of the current residual optical flow and a second bitstream corresponding to the feature data of the current residual image data.

The bitstream may be transmitted from the image decoding apparatus 300 through a network. Also, in an embodiment of the disclosure, the bitstream may be recorded on a data storage medium including a magnetic medium (e.g., a hard disk, a floppy disk, or a magnetic tape), an optical medium (e.g., a CD-ROM or a DVD), or a magneto-optical medium (e.g., a floptical disk).

The obtainer 1250, which may be for example a bitstream obtainer, obtains the feature data of the current residual optical flow and the feature data of the current residual image data from the bitstream generated by the generator 1230. According to an implementation example, in embodiments the obtainer 1250 may receive the feature data of the current residual optical flow and the feature data of the current residual image data from the prediction encoder 1210.

The feature data of the current residual optical flow and the feature data of the current residual image data are transmitted to the prediction decoder 1270, and the prediction decoder 1270 reconstructs a current optical flow by using the feature data of the current residual optical flow and reconstructs a current reconstructed image by using the current optical flow and the feature data of the current residual image data.

The current optical flow and the current reconstructed image obtained by the prediction decoder 1270 may be used in a next image encoding process.

Configurations and operations of the obtainer 1250 and the prediction decoder 1270 may correspond to operations of the obtainer 310 and the prediction decoder 330 of FIGS. 3 through 5, and thus, a detailed description thereof will be omitted. However, in embodiments in which the prediction encoder 1210 includes an optical flow predictor 1217, as shown for example in FIG. 13, the prediction decoder 1270 may not include the optical flow predictor 334 unlike the prediction decoder 330 of FIG. 5. This is because the prediction decoder 1270 may use a current predicted optical flow obtained by the optical flow predictor 1217 included in the prediction encoder 1210.

In an embodiment of the disclosure, the prediction encoder 1210 may obtain feature data of a current residual optical flow by using a current image and a previous reconstructed image, and the generator 1230 may generate a bitstream corresponding to the feature data of the current residual optical flow. The obtainer 1250 may obtain the feature data of the current residual optical flow from the bitstream, and the prediction decoder 1270 may reconstruct a current optical flow based on the feature data of the current residual optical flow.

That is, because the current optical flow is encoded through the prediction encoder 1210, the generator 1230, the obtainer 1250, and the prediction decoder 1270, in this case, the image encoding apparatus 1200 may be referred to as an optical flow encoding apparatus.

The current optical flow reconstructed by the prediction decoder 1270 may be transmitted to another device, so that the other device encodes current residual image data. In detail, the other device may encode the current residual image data corresponding to a difference between the current image and a current predicted image obtained from the previous reconstructed image according to the current optical flow.

Examples of configurations of the prediction encoder 1210 and the generator 1230 will be described in more detail with reference to FIGS. 13 through 15.

Figure 13:
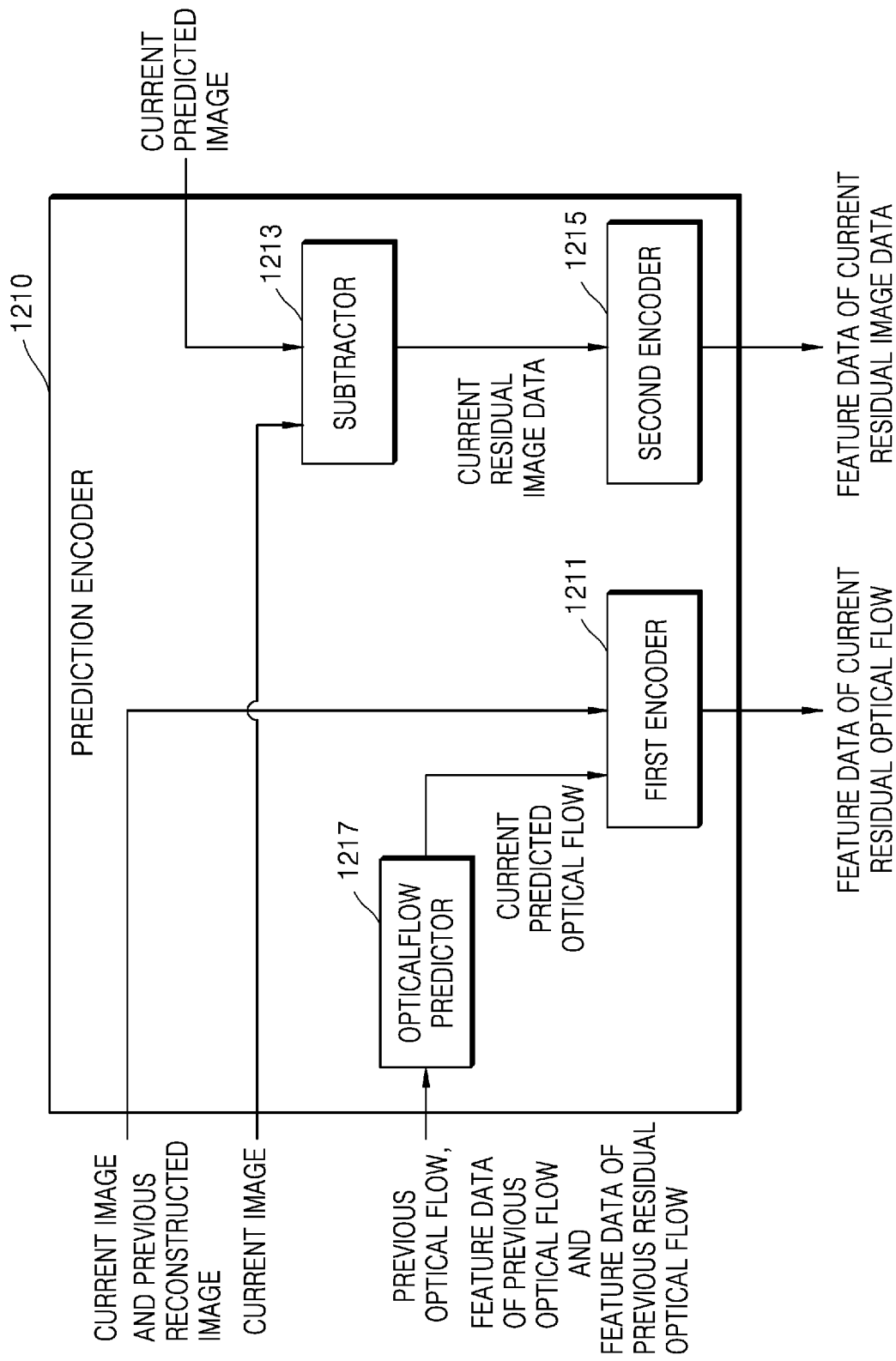
FIG. 13 is a diagram illustrating a configuration of a prediction encoder of FIG. 12, according to an embodiment.

FIG. 13 is a diagram illustrating a configuration of the prediction encoder 1210 of FIG. 12.

The prediction encoder 1210 includes the optical flow predictor 1217, the first encoder 1211, the second encoder 1215, and a subtractor 1213.

The first encoder 1211 and the second encoder 1215 may be stored in a memory. In an embodiment of the disclosure, the first encoder 1211 and the second encoder 1215 may be implemented as at least one dedicated processor for AI.

Referring to FIG. 13, the optical flow predictor 1217 obtains a current predicted optical flow by using at least one of a previous optical flow, feature data of the previous optical flow, or feature data of a previous residual optical flow.

The optical flow predictor 1217 may obtain the current predicted optical flow by using the same method as that of the optical flow predictor 334 of the image decoding apparatus 300.

For example, the optical flow predictor 1217 may have the same configuration as that of the optical flow predictor 600 or 700 of FIG. 6 or 7 and may obtain the current predicted optical flow.

In detail, as described with reference to FIG. 6, the optical flow predictor 1217 may obtain the current predicted optical flow by applying at least one of the previous optical flow, the feature data of the previous optical flow, or the feature data of the previous residual optical flow to the first prediction neural network 610.

Also, as described with reference to FIG. 7, the optical flow predictor 1217 may obtain a second-order optical flow by applying at least one of the previous optical flow, the feature data of the previous optical flow, or the feature data of the previous residual optical flow to the second prediction neural network 710, and may obtain the current predicted optical flow by processing the previous optical flow according to the second-order optical flow.

In another example, the optical flow predictor 1217 may determine the previous optical flow as the current predicted optical flow.

When the optical flow predictor 334 of the image decoding apparatus 300 includes the third decoder 810 and the changer 720 as shown in FIG. 8, the optical flow predictor 1217 of the image encoding apparatus 1200 may have a configuration as described below with reference to FIG. 14.

At least one of a current image, a previous reconstructed image, or the current predicted optical flow is input to the first encoder 1211. At least one of the current image, the previous reconstructed image, or the current predicted optical flow may be concatenated and then may be input to the first encoder 1211.

Because information about a current optical flow may be derived from the current image and the previous reconstructed image, the first encoder 1211 may output, by using the current optical flow identified from the current image and the previous reconstructed image and the current predicted optical flow generated by the optical flow predictor 1217, feature data of a current residual optical flow corresponding to a difference between the current optical flow and the current predicted optical flow.

The first encoder 1211 outputs the feature data of the current residual optical flow by processing at least one of the current image, the previous reconstructed image, or the current predicted optical flow according to parameters set as a result of training.

The prediction decoder 1270 of FIG. 12 reconstructs the current optical flow based on the feature data of the current residual optical flow, and provides a current predicted image generated from the previous reconstructed image to the subtractor 1213 according to the current optical flow.

The subtractor 1213 obtains current residual image data between the current image and the current predicted image. The subtractor 1213 may obtain the current residual image data by subtracting sample values of the current predicted image from sample values of the current image.

The current residual image data is input to the second encoder 1215, and the second encoder 1215 outputs feature data of the current residual image data by processing the current residual image data according to parameters set as a result of training.

The generator 1230 generates a bitstream based on the feature data of the current residual optical flow and the feature data of the current residual image data output from the prediction encoder 1210.

Figure 14:
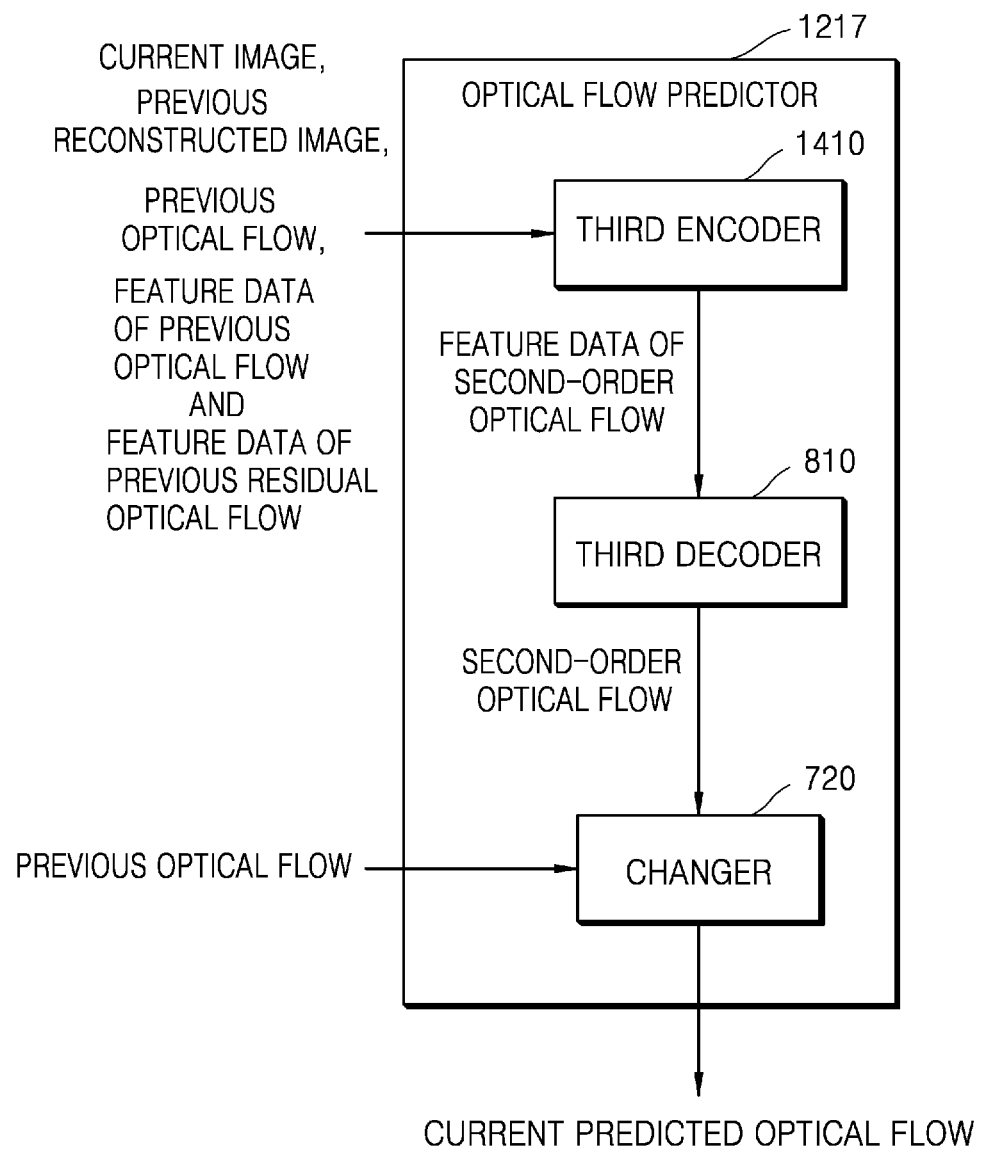
FIG. 14 is a diagram illustrating a configuration of an optical flow predictor, according to an embodiment.

FIG. 14 is a diagram illustrating a configuration of the optical flow predictor 1217 of the image encoding apparatus 1200 corresponding to the optical flow predictor 800 of FIG. 8.

Referring to FIG. 14, the optical flow predictor 1217 includes a third encoder 1410, the third decoder 810, and the changer 720. When compared to FIG. 8, the optical flow predictor 1217 includes the third encoder 1410.

The third encoder 1410 and the third decoder 810 may be stored in a memory. In an embodiment of the disclosure, the third encoder 1410 and the third decoder 810 may be implemented as at least one dedicated processor for AI.

The third encoder 1410 obtains feature data of a second-order optical flow by processing at least one of a current image, a previous reconstructed image, a previous optical flow, feature data of the previous optical flow, or feature data of a previous residual optical flow according to parameters set according to training.

A bitstream corresponding to the feature data of the second-order optical flow may be provided to the image decoding apparatus 300.

The third decoder 810 obtains the second-order optical flow by processing the feature data of the second-order optical flow according to parameters set through training.

The changer 720 may obtain a current predicted optical flow by processing the previous optical flow according to the second-order optical flow.

In an embodiment of the disclosure, the changer 720 may warp the previous optical flow according to the second-order optical flow in order to obtain the current predicted optical flow. The warping is merely an example, and the changer 720 may apply various types of processing for changing positions of samples in the previous optical flow to the previous optical flow in order to generate the current predicted optical flow.

The optical flow predictor 1217 of FIG. 14 obtains the feature data of the second-order optical flow by using various types of data which may be used by the image encoding apparatus 1200. The feature data of the second-order optical flow is signaled to the image decoding apparatus 300. The optical flow predictor 800 of the image decoding apparatus 300 processes the feature data of the second-order optical flow signaled from the image encoding apparatus 1200 by using the third decoder 810 and obtains the second-order optical flow.

A predicted optical flow obtained by the image decoding apparatus 300 by using the feature data of the second-order optical flow signaled from the image encoding apparatus 1200 may be more accurate than a predicted optical flow obtained by the image decoding apparatus 300 by itself. This is because the image encoding apparatus 1200 may use more types of data to obtain the feature data of the second-order optical flow than those which may be available to or used by the image decoding apparatus 300. For example, because a current image may be not used by the image decoding apparatus 300 before the current image is decoded, for example, the optical flow predictors 600 and 700 of FIGS. 6 and 7 do not use a current image in order to obtain a current predicted optical flow.

Figure 15:
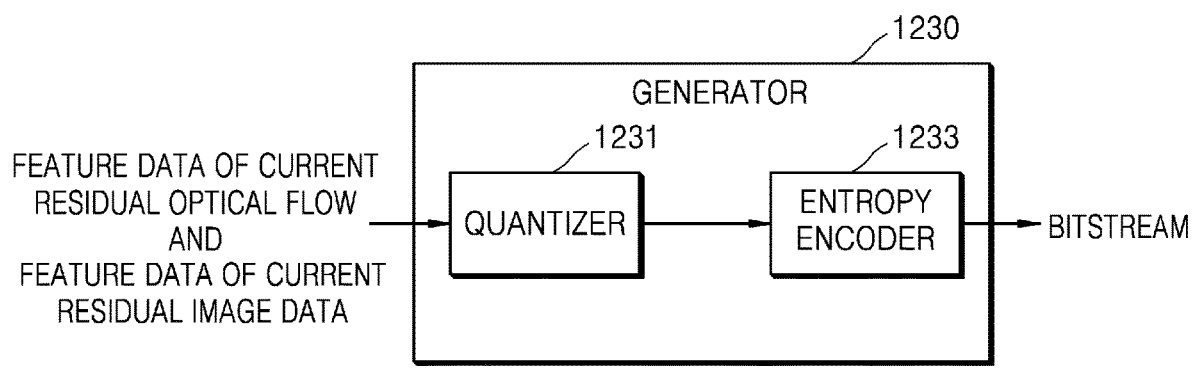
FIG. 15 is a diagram illustrating a configuration of a generator of FIG. 12, according to an embodiment.

FIG. 15 is a diagram illustrating a configuration of the generator 1230 of FIG. 12.

Referring to FIG. 15, the generator 1230 includes a quantizer 1231 and an entropy encoder 1233.

The quantizer 1231 quantizes feature data of a current residual optical flow and feature data of current residual image data.

The entropy encoder 1233 generates a bitstream by entropy-coding the quantized feature data of the current residual optical flow and the quantized feature data of the current residual image data.

According to an implementation example, in embodiments the generator 1230 may further include a transformer. The transformer transforms the feature data of the current residual optical flow and the feature data of the current residual image data from a spatial domain into a frequency domain and provides the transformed feature data to the quantizer 1231.

Also, according to an implementation example, in embodiments the generator 1230 may not include the quantizer 1231. That is, the bitstream corresponding to the feature data of the current residual optical flow and the feature data of the current residual image data may be obtained through processing by the entropy encoder 1233.

Also, according to an implementation example, in embodiments the generator 1230 may generate the bitstream by binarizing the feature data of the current residual optical flow and the feature data of the current residual image data. That is, when the generator 1230 performs only binarization, the quantizer 1231 and the entropy encoder 1233 may be not included in the generator 1230.

Figure 16:
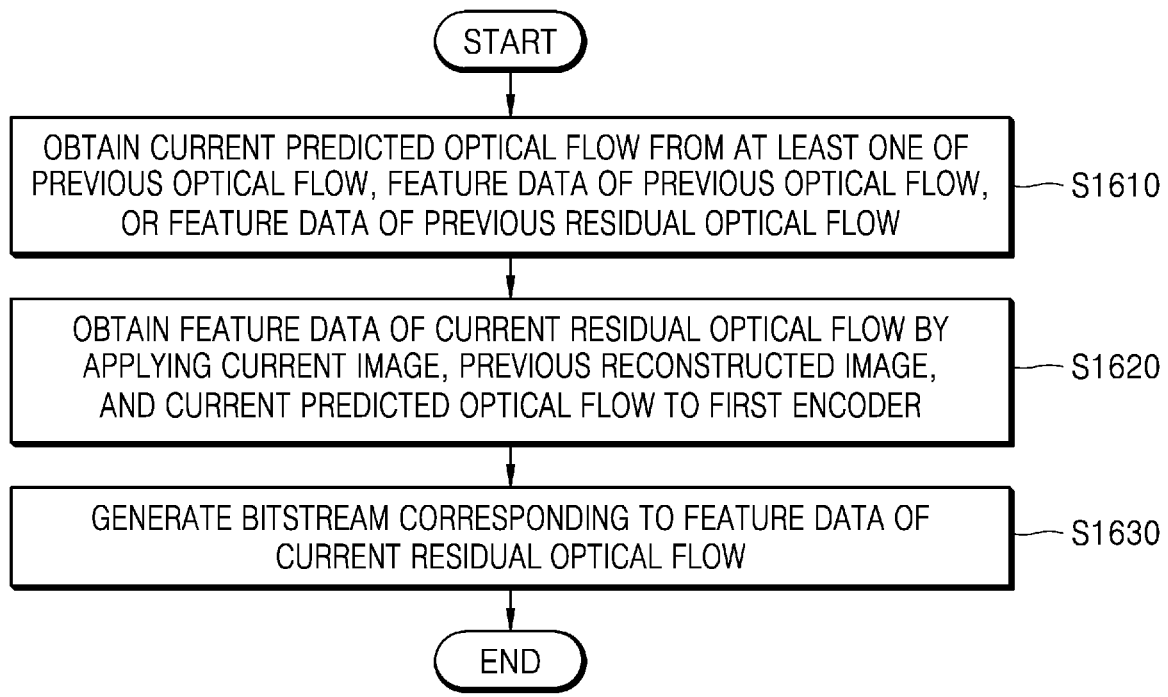
FIG. 16 is a flowchart illustrating a method of encoding an optical flow, according to an embodiment.

FIG. 16 is a flowchart illustrating a method of encoding an optical flow, according to an embodiment of the disclosure.

In operation S1610, the image encoding apparatus 1200 obtains a current predicted optical flow from at least one of a previous optical flow, feature data of the previous optical flow, or feature data of a previous residual optical flow.

In an embodiment of the disclosure, the image encoding apparatus 1200 may determine the previous optical flow as the current predicted optical flow.

In another embodiment of the disclosure, the image encoding apparatus 1200 may obtain the current predicted optical flow by applying at least one of the previous optical flow, the feature data of the previous optical flow, or the feature data of the previous residual optical flow to the first prediction neural network 610.

In another embodiment of the disclosure, the image encoding apparatus 1200 may obtain a second-order optical flow by applying at least one of the previous optical flow, the feature data of the previous optical flow, or the feature data of the previous residual optical flow to the second prediction neural network 710, and may obtain the current predicted optical flow by processing the previous optical flow according to the second-order optical flow.

In another embodiment of the disclosure, the image encoding apparatus 1200 obtains feature data of the second-order optical flow by applying at least one of a current image, a previous reconstructed image, the previous optical flow, the feature data of the previous optical flow, or the feature data of the previous residual optical flow to the third encoder 1410, and obtains the second-order optical flow by applying the feature data of the second-order optical flow to the third decoder 810. The image encoding apparatus 1200 may obtain the current predicted optical flow by processing the previous optical flow according to the second-order optical flow.

In operation S1620, the image encoding apparatus 1200 obtains feature data of a current residual optical flow by applying at least one of the current image, the previous reconstructed image, or the current predicted optical flow to the neural network based first encoder 1211.

In operation S1630, the image encoding apparatus 1200 generates a bitstream corresponding to the feature data of the current residual optical flow.

In an embodiment of the disclosure, the bitstream may further include the feature data of the second-order optical flow and/or feature data of current residual image data.

In an embodiment of the disclosure, the image encoding apparatus 1200 reconstructs a current optical flow from the feature data of the current residual optical flow, and obtains a current predicted image by processing the previous reconstructed image based on the reconstructed current optical flow. The image encoding apparatus 1200 may obtain the feature data of the current residual image data by applying the current residual image data corresponding to a difference between the current predicted image and the current image to the second encoder 1215. The feature data of the current residual image data may be included in the bitstream.

In another embodiment of the disclosure, the image encoding apparatus 1200 reconstructs the current optical flow from the feature data of the current residual optical flow, and reconstructs the current predicted image by processing the previous reconstructed image based on the reconstructed current optical flow. The current residual image data corresponding to a difference between the current predicted image and the current image may be included in the bitstream.

An encoding process described with reference to FIGS. 12 through 16 considers a case where a previous image is processed through inter prediction. This is because a previous optical flow used to encode a current optical flow is generated in an inter prediction process of the previous image.

That is, an encoding process described with reference to FIGS. 12 through 16 may be applied when a current image is a P frame and a previous image is a P frame, for example when a current image is a P frame after a P frame. When a previous image is an I frame, a previous optical flow may not be obtained. Accordingly, an encoding process for a case where a current image is a P frame after an I frame will be described.

Figure 17:
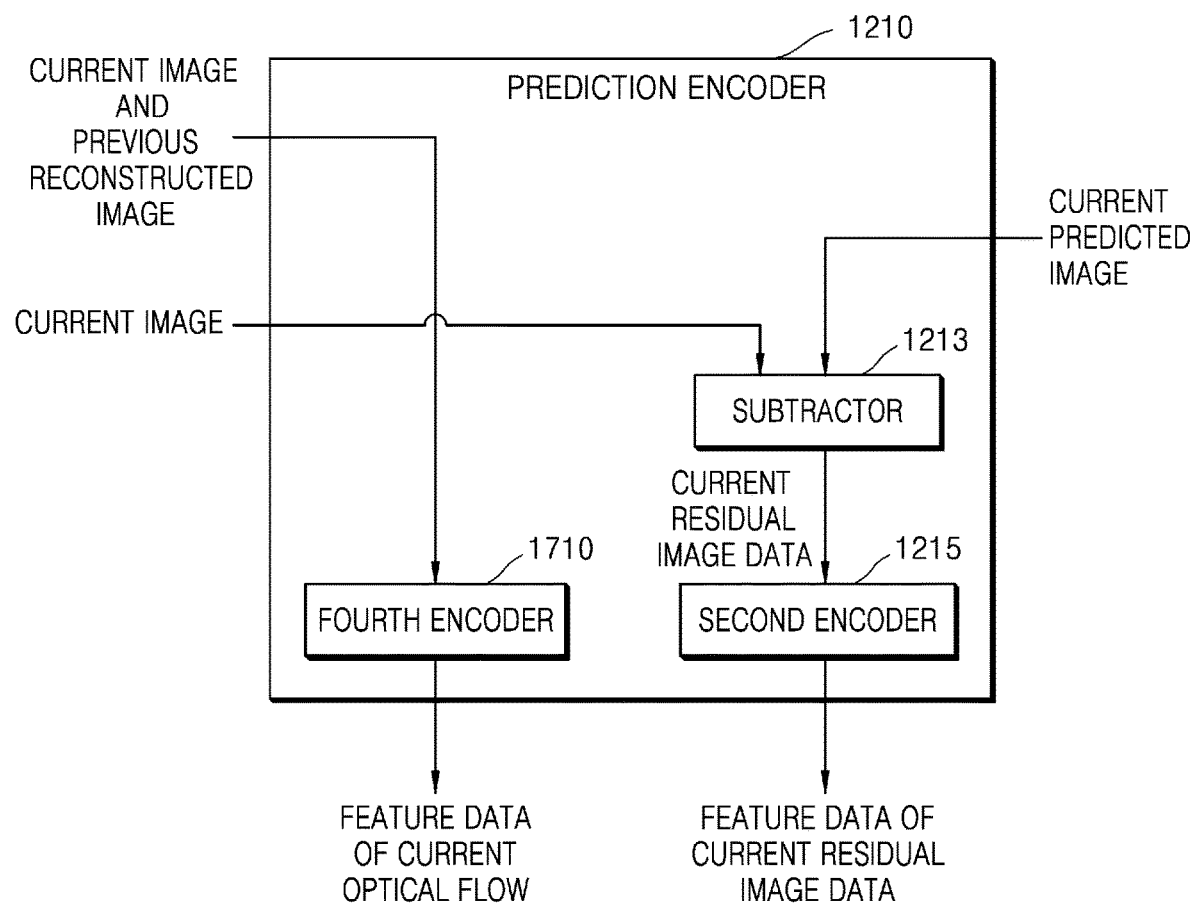
FIG. 17 is a diagram illustrating another configuration of a prediction encoder, according to an embodiment.

FIG. 17 is a diagram illustrating another configuration of the prediction encoder 1210.

Referring to FIG. 17, the prediction encoder 1210 includes a fourth encoder 1710, the second encoder 1215, and the subtractor 1213.

The fourth encoder 1710 and the second encoder 1215 may be stored in a memory. In an embodiment of the disclosure, the fourth encoder 1710 and the second encoder 1215 may be implemented as at least one dedicated processor for AI.

The fourth encoder 1710 obtains feature data of a current optical flow by processing a current image and a previous reconstructed image according to parameters set according to training.

The prediction decoder 1270 of FIG. 12 reconstructs the current optical flow based on the feature data of the current optical flow, and provides a current predicted image generated from the previous reconstructed image to the subtractor 1213 according to the current optical flow. The prediction decoder 1270 may use the fourth decoder 1010 of FIG. 10 in order to reconstruct the current optical flow.

The subtractor 1213 obtains current residual image data between the current image and the current predicted image. The subtractor 1213 may obtain the current residual image data by subtracting sample values of the current predicted image from sample values of the current image.

The current residual image data is input to the second encoder 1215, and the second encoder 1215 outputs feature data of the current residual image data by processing the current residual image data according to parameters set as a result of training.

The generator 1230 generates a bitstream based on the feature data of the current optical flow and the feature data of the current residual image data output from the prediction encoder 1210.

The bitstream may be transmitted from the image decoding apparatus 300 through a network. The bitstream may be recorded on a data storage medium including a magnetic medium (e.g., a hard disk, a floppy disk, or a magnetic tape), an optical medium (e.g., a compact disc read-only memory (CD-ROM) or a digital versatile disc (DVD)), or a magneto-optical medium (e.g., a floptical disk).

In embodiments, the prediction encoder 1210 may further include a determiner configured to determine whether the current image is a P frame after an I frame or a P frame after a P frame.

When the current image is a P frame after a P frame, the prediction encoder 1210 may obtain feature data of a current residual optical flow through the optical flow predictor 1217 and the first encoder 1211 of FIG. 13, and when the current image is a P frame after an I frame, the prediction encoder 1210 may obtain the feature data of the current optical flow through the fourth encoder 1710 of FIG. 17.

At least one of the first encoder 1211, the second encoder 1215, the third encoder 1410, the fourth encoder 1710, the first decoder 331, the second decoder 333, the third decoder 810, the fourth decoder 1010, the first prediction neural network 610, or the second prediction neural network 710 may include a convolutional layer.

An example of a structure of each of the first encoder 1211, the second encoder 1215, the third encoder 1410, the fourth encoder 1710, the first decoder 331, the second decoder 333, the third decoder 810, the fourth decoder 1010, the first prediction neural network 610, and the second prediction neural network 710 will be described with reference to FIG. 18.

Figure 18:
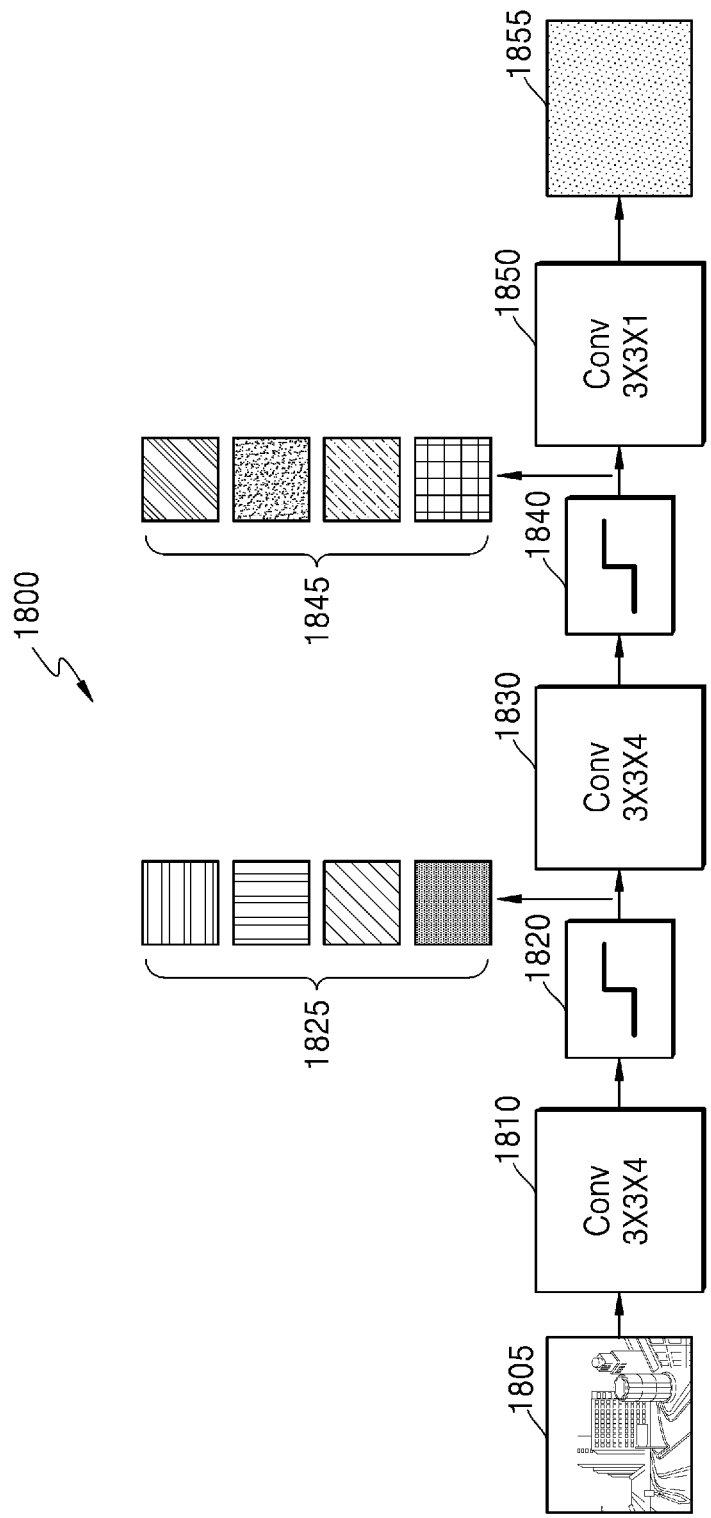
FIG. 18 is a diagram illustrating a structure of a neural network, according to an embodiment.

FIG. 18 is a diagram illustrating a structure of a neural network 1800, according to an embodiment of the disclosure.

As shown in FIG. 18, input data 1805 is input to a first convolutional layer 1810. The input data 1805 varies according to whether the neural network 1800 serves as the first encoder 1211, the second encoder 1215, the third encoder 1410, the fourth encoder 1710, the first decoder 331, the second decoder 333, the third decoder 810, the fourth decoder 1010, the first prediction neural network 610, or the second prediction neural network 710.

For example, when the neural network 1800 serves as the first encoder 1211, the input data 1805 may correspond to a result of concatenating a current image, a previous reconstructed image, and a predicted optical flow. As another example, when the neural network 1800 serves as the second encoder 1215, the input data 1805 may correspond to current residual image data.

The indication "3×3×4" marked on the first convolutional layer 1810 of FIG. 18 may indicate that convolution is performed on one piece of input data 1805 by using four filter kernels having a size of 3×3. Four feature maps are generated by the four filter kernels as a result of the convolution.

The feature maps generated by the first convolutional layer 1810 represent unique features of the input data 1805. For example, each feature map may represent vertical features, horizontal features, or edge features of the input data 1805.

An example of a convolution operation performed by the first convolutional layer 1810 will be described in detail with reference to FIG. 19.

One feature map 1950 may be generated by performing multiplication and addition between parameters of a filter kernel 1930 having a size of 3×3 used in the first convolutional layer 1810 and sample values in the corresponding input data 1805 corresponding thereto. Because four filter kernels 1930 are used in the first convolutional layer 1810, four feature maps 1950 may be generated by performing convolution using the four filter kernels 1930.

Figure 19:
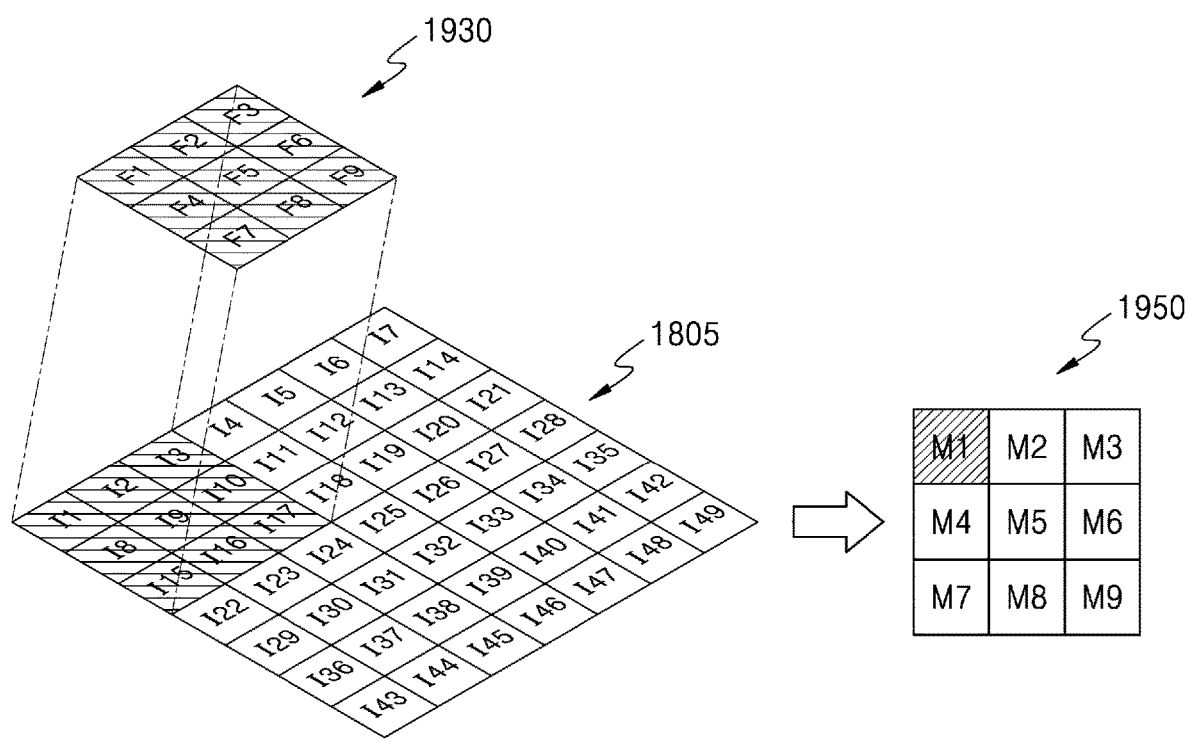
FIG. 19 is a diagram for describing a convolution operation performed at a convolutional layer of FIG. 18, according to an embodiment.

In FIG. 19, I1 through I49 marked on the input data 1805 indicate samples of the input data 1805, and F1 through F9 marked on the filter kernel 1930 indicate samples, which may also be referred to as parameters, of the filter kernel 1930. Also, M1 through M9 marked on the feature map 1950 indicate samples of the feature map 1950.

In the convolution operation, sample values of I1, I2, I3, I8, I9, I10, I15, I16, and I17 of the input data 1805 may be respectively multiplied by F1, F2, F3, F4, F5, F6, F7, F8, and F9 of the filter kernel 1930, and a value obtained by combining (e.g., adding) resultant values of the multiplication may be assigned as a value of M1 of the feature map 1950. When a stride of 2 is set for the convolution operation, sample values of I3, I4, I5, I10, I11, I12, I17, I18, and I19 of the input data 1805 may be respectively multiplied by F1, F2, F3, F4, F5, F6, F7, F8, and F9 of the filter kernel 1930, and a value obtained by combining result values of the multiplication may be assigned as a value of M2 of the feature map 1950.

By performing the convolution operation between the sample values in the input data 1805 and the samples of the filter kernel 1930 while the filter kernel 1930 moves based on the stride to a last sample of the input data 1805, the feature map 1950 having a certain size may be obtained.

According to the disclosure, values of parameters of the neural network 1800, for example, samples of the filter kernel 1930 (e.g., F1, F2, F3, F4, F5, F6, F7, F8, and F9 of the filter kernel 1930) used by convolutional layers of the neural network 1800 may be optimized by training the neural network 1800.

Although the convolutional layers included in the neural network 1800 may perform the convolution operation of FIG. 19, the convolution operation of FIG. 19 is merely an example and embodiments are not limited thereto.

Referring back to FIG. 18, the feature maps of the first convolutional layer 1810 are input to a first activation layer 1820.

The first activation layer 1820 may give non-linear features to each feature map. The first activation layer 1820 may include a sigmoid function, a hyperbolic tangent (tan h) function, and a rectified linear unit (ReLU) function, but embodiments are not limited thereto.

When the first activation layer 1820 gives non-linear features, it means that some sample values of the feature maps are changed and output. In this case, the change is performed by applying non-linear features.

The first activation layer 1820 determines whether to transmit the sample values of the feature maps to a second convolutional layer 1830. For example, some sample values of the feature maps are activated by the first activation layer 1820 and are transmitted to the second convolutional layer 1830, and some other sample values are inactivated by the first activation layer 1820 and are not transmitted to the second convolutional layer 1830. The unique features of the input data 1805 represented by the feature maps are emphasized by the first activation layer 1820.

Feature maps 1825 output from the first activation layer 1820 are input to the second convolutional layer 1830. Any one of the feature maps 1825 of FIG. A 18 is a result of processing the feature map 1950 of FIG. 19 by the first activation layer 1820.

The indication "3×3×4" marked on the second convolutional layer 1830 may indicate that convolution is performed on the input feature maps 1825 by using four filter kernels having a size of 3×3. An output of the second convolutional layer 1830 is input to a second activation layer 1840. The second activation layer 1840 may give non-linear features to input feature maps.

Feature maps 1845 output from the second activation layer 1840 are input to a third convolutional layer 1850. 3×3×1 marked on the third convolutional layer 1850 represents that convolution is performed to generate one piece of output data 1855 by using one filter kernel having a size of 3×3.

The output data 1855 varies according to whether the neural network 1800 serves as the first encoder 1211, the second encoder 1215, the third encoder 1410, the fourth encoder 1710, the first decoder 331, the second decoder 333, the third decoder 810, the fourth decoder 1010, the first prediction neural network 610, or the second prediction neural network 710.

For example, when the neural network 1800 serves as the first encoder 1211, the output data 1855 may be feature data of a current residual optical flow. As another example, when the neural network 1800 serves as the second encoder 1215, the output data 1855 may be feature data of current residual image data.

Although the neural network 1800 is illustrated as including three convolutional layers and two activation layers in FIG. 18, this is merely an example, and according to an implementation example, in embodiments the number of convolutional layers and activation layers included in the neural network 1800 may vary in various ways.

Also, according to an implementation example, in embodiments the neural network 1800 may be implemented as a recurrent neural network (RNN). This means that the neural network 1800 according to an embodiment of the disclosure may be changed from a convolutional neural network (CNN) structure to an RNN structure.

In an embodiment of the disclosure, the image decoding apparatus 300 and the image encoding apparatus 1200 may include at least one arithmetic logic unit (ALU) for the convolution and activation operations.

The ALU may be implemented as a processor. For the convolution operation, the ALU may include a multiplier for multiplying sample values of a filter kernel by sample values of a feature map output from a previous layer or the input data 1805, and an adder for adding resultant values of the multiplication.

For the activation operation, the ALU may include a multiplier for multiplying input sample values by weights used for a pre-determined sigmoid function, a tan h function, or an ReLU function, and a comparator for comparing a result of the multiplication with a certain value and determining whether to transmit input sample values to a next layer.

An example of a method of training neural networks used in an image encoding and decoding process is described below with reference to FIGS. 20 through 22.

Figure 20:
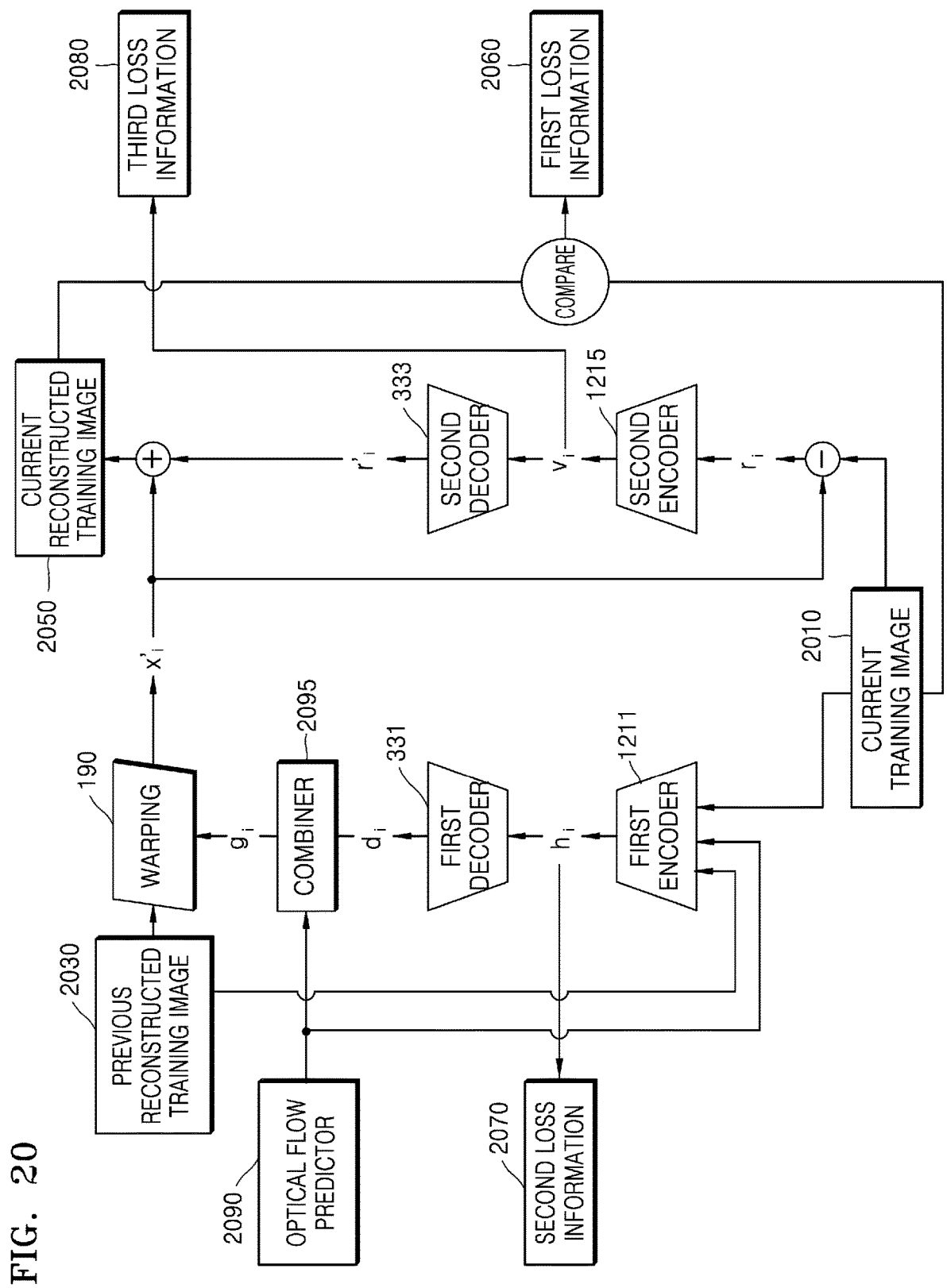
FIG. 20 is a diagram for describing a method of training neural networks used in an inter prediction process, according to an embodiment.

FIG. 20 is a diagram for describing a method of training the first decoder 331, the second decoder 333, the first encoder 1211, the second encoder 1215, and a neural network used in an optical flow predictor 2090. In embodiments, the optical flow predictor 2090 may correspond to the optical flow predictor 600 including the first prediction neural network 610 of FIG. 6. In embodiments, the optical flow predictor 2090 may correspond to the optical flow predictor 700 including the second prediction neural network 710 of FIG. 7. In embodiments, the optical flow predictor 2090 may correspond to the optical flow predictor 800 including the third decoder 810. In embodiments, the optical flow predictor 2090 may correspond to the optical flow predictor 1217 including the third encoder 1410 of FIG. 14.

In FIG. 20, a current training image 2010, a previous reconstructed training image 2030, and a current reconstructed training image 2050 respectively correspond to a current image, a previous reconstructed image, and a current reconstructed image.

When the first decoder 331, the second decoder 333, the first encoder 1211, the second encoder 1215, and the neural network used in the optical flow predictor 2090 are trained, a similarity between the current reconstructed training image 2050 and the current training image 2010 and a bit rate of a bitstream to be generated by encoding the current training image 2010 may be considered. To this end, in an embodiment of the disclosure, the first decoder 331, the second decoder 333, the first encoder 1211, the second encoder 1215, and the neural network used in the optical flow predictor 2090 may be trained according to first loss information 2060 corresponding to the similarity between the current training image 2010 and the current reconstructed training image 2050, and second loss information 2070 and third loss information 2080 corresponding to a size of the bitstream.

Referring to FIG. 20, a current predicted optical flow is obtained through the optical flow predictor 2090. The current predicted optical flow may be obtained according to an embodiment described with reference to FIG. 6, an embodiment described with reference to FIG. 7, or an embodiment described with reference to FIG. 14. According to an implementation example, in embodiments a previous optical flow may be determined as the current predicted optical flow.

The current predicted optical flow, the current training image 2010, and the previous reconstructed training image 2030 are input to the first encoder 1211. The first encoder 1211 outputs feature data $h_i$ of a current residual optical flow by processing the current predicted optical flow, the current training image 2010, and the previous reconstructed training image 2030.

The feature data $h_i$ of the current residual optical flow is input to the first decoder 331, and the first decoder 331 outputs the current residual optical flow $d_i$ by processing the feature data $h_i$ of the current residual optical flow.

When the current predicted optical flow and the current residual optical flow $d_i$ are combined with each other, for example using combiner 2095, a current optical flow $g_i$ is obtained.

When the previous reconstructed training image 2030 is warped, for example by the warping 190, according to the current optical flow $g_i$, a current predicted training image $x'_i$ is generated, and current residual image data $r_i$ corresponding to a difference between the current predicted training image $x'_i$ and the current training image 2010 is obtained.

The current residual image data $r_i$ is input to the second encoder 1215, and the second encoder 1215 outputs feature data $v_i$ of the current residual image data by processing the current residual image data $r_i$.

The feature data $v_i$ of the current residual image data is input to the second decoder 333.

The second decoder 333 outputs current residual image data $r'_i$ by processing the feature data $v_i$ of the current residual image data, and when the current predicted training image $x'_i$ and the current residual image data $r'_i$ are combined with each other, the current reconstructed training image 2050 is obtained.

In order to train the first decoder 331, the second decoder 333, the first encoder 1211, the second encoder 1215, and the neural network used in the optical flow predictor 2090, at least one of the first loss information 2060, the second loss information 2070, or the third loss information 2080 may be obtained.

The first loss information 2060 corresponds to a difference between the current training image 2010 and the current reconstructed training image 2050. The difference between the current training image 2010 and the current reconstructed training image 2050 may include at least one of an L1-norm value, an L2-norm value, a structural similarity (SSIIM) value, a peak signal-to-noise ratio-human vision system (PSNR-HVS) value, a multiscale (MS) SSIM (MS-SSIM) value, a variance inflation factor (VIF) value, or a video multimethod assessment fusion (VMAF) value determined based on the current training image 2010 and the current reconstructed training image 2050.

Because the first loss information 2060 is related to the quality of the current reconstructed training image 2050, the first loss information 2060 may be referred to as quality loss information.

The second loss information 2070 corresponds to entropy of the feature data $h_i$ of the current residual optical flow or a bit rate of a bitstream corresponding to the feature data $h_i$ of the current residual optical flow. Also, the third loss information 2080 corresponds to entropy of the feature data $v_i$ of the current residual image data or a bit rate of a bitstream corresponding to the feature data $v_i$ of the current residual image data.

In embodiments, when a bitstream includes both the feature data $h_i$ of the current residual optical flow and the feature data $v_i$ of the current residual image data, fourth loss information corresponding to a bit rate of the bitstream may be calculated. In this case, the second loss information 2070 and the third loss information 2080 may be not used for training.

Because the second loss information 2070 and the third loss information 2080 are related to the efficiency of encoding the current training image 2010, the second loss information 2070 and the third loss information 2080 may be referred to as compression loss information.

The first decoder 331, the second decoder 333, the first encoder 1211, the second encoder 1215, and the neural network used in the optical flow predictor 2090 may be trained to reduce or minimize final loss information derived from at least one of the first loss information 2060, the second loss information 2070, or the third loss information 2080.

In detail, the first decoder 331, the second decoder 333, the first encoder 1211, the second encoder 1215, and the neural network used in the optical flow predictor 2090 may be trained to reduce or minimize final loss information by changing values of pre-set parameters.

In an embodiment of the disclosure, the final loss information may be calculated according to Equation 1.

final loss information=$a$*first loss information+$b$*second loss information+$c$*third loss information  [Equation 1]

In Equation 1, a, b, and c denote weights respectively applied to the first loss information 2060, the second loss information 2070, and the third loss information 2080.

According to Equation 1, it is found that the first decoder 331, the second decoder 333, the first encoder 1211, the second encoder 1215, and the neural network used in the optical flow predictor 2090 may be trained so that the current reconstructed training image 2050 is as similar as possible to the current training image 2010 and a size of a bitstream corresponding to data output from the first encoder 1211 and the second encoder 1215 is minimized.

A training process of FIG. 20 corresponds to a training process for a P frame after a P frame. For a P frame after an I frame, the fourth encoder 1710 and the fourth decoder 1010 of FIGS. 10 and 17 may be trained. To this end, the first encoder 1211 and the first decoder 331 of FIG. 20 may be replaced with the fourth encoder 1710 and the fourth decoder 1010. The optical flow predictor 2090 and a combiner 2095 may be not used in a training process.

An example of a process of training the second encoder 1215, the second decoder 333, the fourth encoder 1710, and the fourth decoder 1010 for a P frame after an I frame is described below. The current training image 2010 and the previous reconstructed training image 2030 may be input to the fourth encoder 1710.

The fourth encoder 1710 outputs feature data of a current optical flow by processing the current training image 2010 and the previous reconstructed training image 2030, and the feature data of the current optical flow is input to the fourth decoder 1010.

The fourth decoder 1010 outputs the current optical flow by processing the feature data of the current optical flow.

When the previous reconstructed training image 2030 is warped for example by the warping 190, according to the current optical flow, a current predicted training image $x'_i$ is generated, and current residual image data $r_i$ corresponding to a difference between the current predicted training image $x'_i$ and the current training image 2010 is obtained.

The current residual image data $r_i$ is input to the second encoder 1215, and the second encoder 1215 outputs feature data $v_i$ of the current residual image data by processing the current residual image data $r_i$.

The feature data $v_i$ of the current residual image data is input to the second decoder 333. The second decoder 333 outputs current residual image data $r'_i$ by processing the feature data $v_i$ of the current residual image data, and when the current predicted training image $x'_i$ and the current residual image data $r'_i$ are combined with each other, the current reconstructed training image 2050 is obtained.

The second encoder 1215, the second decoder 333, the fourth encoder 1710, and the fourth decoder 1010 may be trained so that final loss information derived from at least one of the first loss information 2060, the second loss information 2070, or the third loss information 2080 is reduced or minimized.

The first loss information 2060 may correspond to a difference between the current training image 2010 and the current reconstructed training image 2050. The second loss information 2070 may correspond to entropy of the feature data of the current optical flow or a bit rate of a bitstream corresponding to the feature data of the current optical flow. Also, the third loss information 2080 may correspond to entropy of the feature data $v_i$ of the current residual image data or a bit rate of a bitstream corresponding to the feature data $v_i$ of the current residual image data.

In embodiments, the second encoder 1215 and the second decoder 333 are used in both a training process for a P frame after a P frame and a training process for a P frame after an I frame.

In an embodiment of the disclosure, the second encoder 1215 and the second decoder 333 may be trained through a training process for a P frame after a P frame, and then may be additionally trained through a training process for a P frame after an I frame.

In another embodiment of the disclosure, the second encoder 1215 and the second decoder 333 may be trained through a training process for a P frame after an I frame, and then may be additionally trained for a P frame after a P frame.

In another embodiment of the disclosure, the second encoder 1215 and the second decoder 333 may be separately trained through a training process for a P frame after an I frame and a training process for a P frame after a P frame. For example, the second encoder 1215 and the second decoder 333 trained through a training process for a P frame after a P frame may be applied to a current image after a P frame, and the second encoder 1215 and the second decoder 333 trained through a training process for a P frame after an I frame may be applied to a current image after an I frame.

Figure 21:
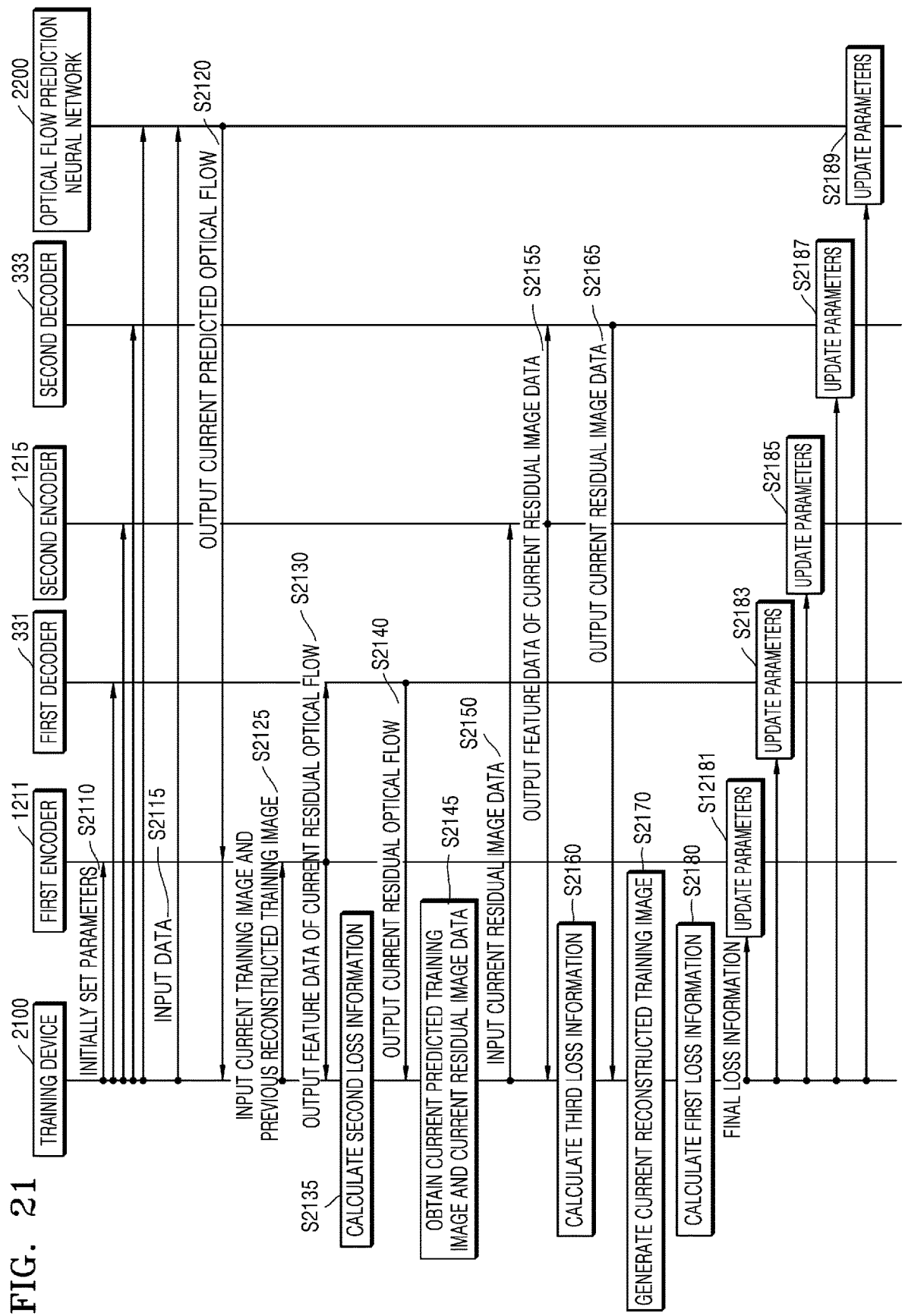
FIG. 21 is a diagram for describing a process by which a training device trains neural networks in an inter prediction process, according to an embodiment.

FIG. 21 is a diagram for describing a process by which a training device 2100 trains the first decoder 331, the second decoder 333, the first encoder 1211, the second encoder 1215, and an optical flow prediction neural network 2200.

The optical flow prediction neural network 2200 is a neural network used to obtain a predicted optical flow, and may be the first prediction neural network 610 of FIG. 6, the second prediction neural network 710 of FIG. 7, or the third encoder 1410 and the third decoder 810 of FIG. 14.

An example of a training process described with reference to FIG. 20 may be performed by the training device 2100. The training device 2100 may be, for example, the image encoding apparatus 1200 or a separate server. Parameters obtained as a result of training may be stored in the image encoding apparatus 1200 and the image decoding apparatus 300.

Referring to FIG. 21, the training device 2100 initially sets parameters of the first encoder 1211, the first decoder 331, the second encoder 1215, the second decoder 333, and the optical flow prediction neural network 2200 (S2110). Accordingly, the first encoder 1211, the first decoder 331, the second encoder 1215, the second decoder 333, and the optical flow prediction neural network 2200 may operate according to the initially set parameters.

The training device 2100 inputs data required by the optical flow prediction neural network 2200 to obtain a current predicted optical flow (e.g., a previous optical flow, feature data of the previous optical flow, and feature data of a previous residual optical flow) to the optical flow prediction neural network 2200 at operation S2115.

The optical flow prediction neural network 2200 outputs the current predicted optical flow to the first encoder 1211 and the training device 2100 by processing the input data at operation S2120.

The training device 2100 inputs a current training image 2010 and a previous reconstructed training image 2030 to the first encoder 1211 at operation S2125.

The first encoder 1211 outputs feature data $h_i$ of a current residual optical flow to the training device 2100 and the first decoder 331 by processing the current predicted optical flow, the current training image 2010, and the previous reconstructed training image 2030 at operation S2130.

The training device 2100 calculates second loss information 2070 from the feature data $h_i$ of the current residual optical flow at operation S2135.

The first decoder 331 outputs the current residual optical flow $d_i$ to the training device 2100 by processing the feature data $h_i$ of the current residual optical flow at operation S2140.

The training device 2100 generates a current predicted training image $X'_i$ by using a current optical flow obtained based on the current predicted optical flow and the current residual optical flow $d_i$, and obtains current residual image data $r_i$ corresponding to a difference between the current predicted training image $x'_i$ and the current training image 2010 at operation S2145.

The training device 2100 inputs the current residual image data $r_i$ to the second encoder 1215 at operation S2150, and the second encoder 1215 outputs feature data $v_i$ of the current residual image data to the training device 2100 and the second decoder 333 at operation S2155.

The training device 2100 calculates third loss information 2080 from the feature data $v_i$ of the current residual image data at operation S2160.

The second decoder 333 outputs current residual image data $r'_i$ to the training device 2100 by processing the feature data $v_i$ of the current residual image data at operation S2165.

The training device 2100 generates a current reconstructed training image 2050 from the current residual image data $r'_i$ and the current reconstructed training image 2050 at operation S2170.

The training device 2100 calculates first loss information 2060 corresponding to a difference between the current training image 2010 and the current reconstructed training image 2050 at operation S2180.

The training device 2100 calculates final loss information by combining at least one of the first loss information 2060, the second loss information 2070, or the third loss information 2080, and the first decoder 331, the second decoder 333, the first encoder 1211, the second encoder 1215, and the optical flow prediction neural network 2200 update the initially set parameters through back propagation based on the final loss information at operations S2181, S2183, S2185, S2187, and S2189.

Next, the training device 2100, the first decoder 331, the second decoder 333, the first encoder 1211, the second encoder 1215, and the optical flow prediction neural network 2200 update the parameters by repeatedly performing operations S2115 through S2189 until the final loss information is minimized. In this case, during each repeated operation, the first decoder 331, the second decoder 333, the first encoder 1211, the second encoder 1215, and the optical flow prediction neural network 2200 operate according to the parameters updated in a previous process.

Figure 22:
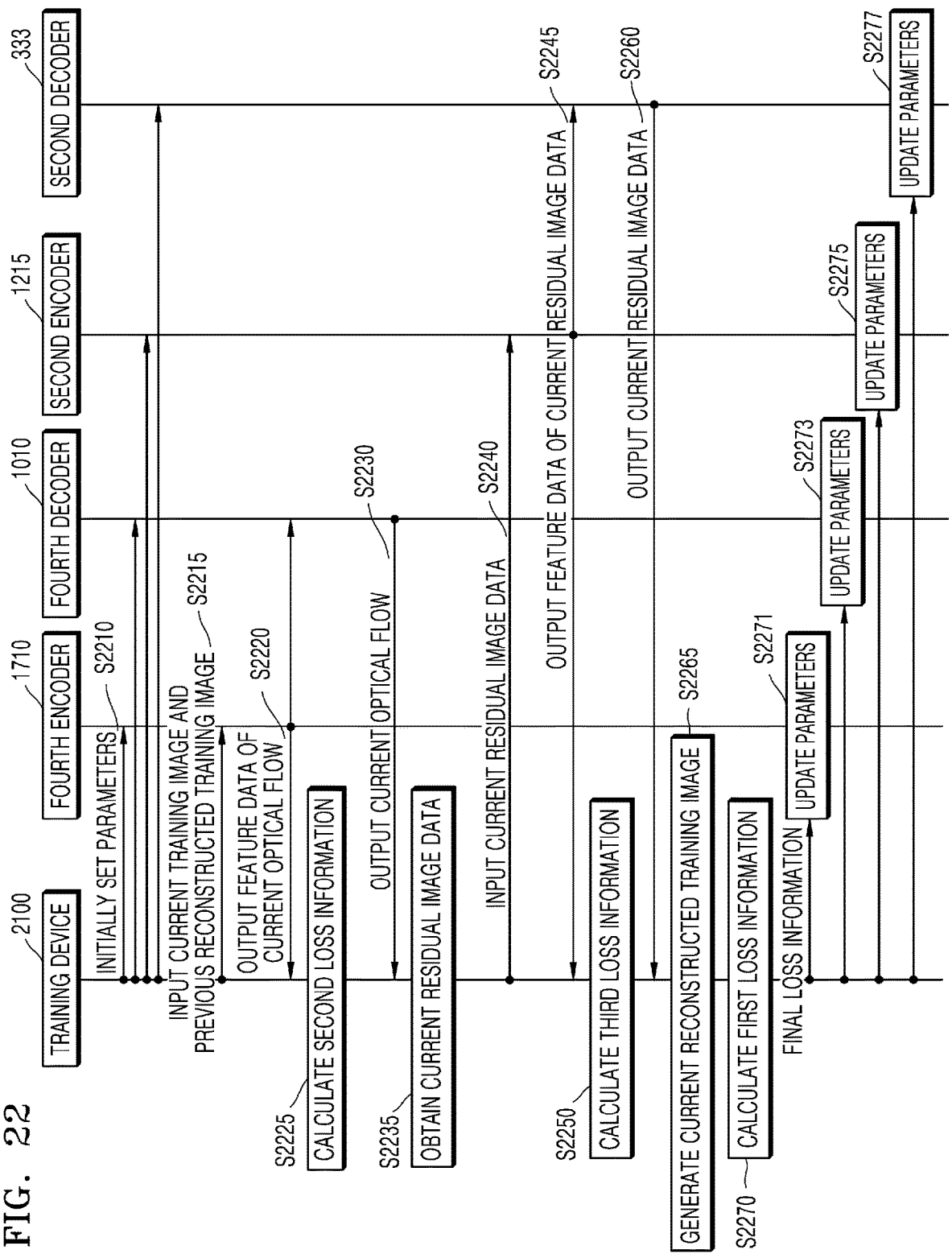
FIG. 22 is a diagram for describing another process by which a training device trains neural networks in an inter prediction process, according to an embodiment.

FIG. 22 is a diagram for describing a process by which the training device 2100 trains the fourth encoder 1710, the fourth decoder 1010, the second encoder 1215, and the second decoder 333.

A training process of FIG. 21 may be a training process for a P frame after a P frame, whereas a training process of FIG. 22 may be a training process for a P frame after an I frame.

Referring to FIG. 22, the training device 2100 initially sets parameters of the fourth encoder 1710, the fourth decoder 1010, the second encoder 1215, and the second decoder 333 at operation S2210. Accordingly, the fourth encoder 1710, the fourth decoder 1010, the second encoder 1215, and the second decoder 333 may operate according to the initially set parameters. According to an implementation example, in embodiments the second encoder 1215 and the second decoder 333 may initially operate according to parameters set through the training process of FIG. 21.

The training device 2100 inputs a current training image 2010 and a previous reconstructed training image 2030 to the fourth encoder 1710 at operation S2215.

The fourth encoder 1710 outputs feature data of a current optical flow to the training device 2100 and the fourth decoder 1010 by processing the current training image 2010 and the previous reconstructed training image 2030 at operation S2220.

The training device 2100 calculates second loss information 2070 from the feature data of the current optical flow at operation S2225.

The fourth decoder 1010 outputs the current optical flow to the training device 2100 by processing the feature data of the current optical flow at operation S2230.

The training device 2100 generates a current predicted training image $x'_i$ by using the current optical flow, and obtains current residual image data $r_i$ corresponding to a difference between the current predicted training image $x'_i$ and the current training image 2010 at operation S2235.

The training device 2100 inputs the current residual image data $r_i$ to the second encoder 1215 at operation S2240, and the second encoder 1215 outputs feature data $v_i$ of the current residual image data to the training device 2100 and the second decoder 333 at operation S2245.

The training device 2100 calculates third loss information 2080 from the feature data $v_i$ of the current residual image data at operation S2250.

The second decoder 333 outputs current residual image data $r'_i$ to the training device 2100 by processing the feature data $v_i$ of the current residual image data at operation S2260.

The training device 2100 generates a current reconstructed training image 2050 from the current residual image data $r_i$ and the current predicted training image $x'_i$ at operation S2265.

The training device 2100 calculates first loss information 2060 corresponding to a difference between the current training image 2010 and the current reconstructed training image 2050 at operation S2270.

The training device 2100 calculates final loss information by combining at least one of the first loss information 2060, the second loss information 2070, or the third loss information 2080, and the fourth encoder 1710, the fourth decoder 1010, the second encoder 1215, and the second decoder 333 update the initially set parameters through back propagation based on the final loss information at operations S2271, S2273, S2275, and S2277.

Next, the training device 2100, the fourth encoder 1710, the fourth decoder 1010, the second encoder 1215, and the second decoder 333 update the parameters by repeatedly performing operations S2215 through S2277 until the final loss information is minimized. In this case, during each repeated operation, the fourth encoder 1710, the fourth decoder 1010, the second encoder 1215, and the second decoder 333 operate according to the parameters updated in a previous process.

Embodiments of the disclosure described herein may be written as a computer-executable program, and the written program may be stored in a machine-readable storage medium.

A machine-readable storage medium may be provided as a non-transitory storage medium. Here, 'non-transitory' means that the storage medium does not include a signal and is tangible, but does not distinguish whether data is stored semi-permanently or temporarily in the storage medium. For example, the 'non-transitory storage medium' may include a buffer in which data is temporarily stored.

According to an embodiment of the disclosure, methods according to various embodiments of the disclosure may be provided in a computer program product. The computer program product is a product purchasable between a seller and a purchaser. The computer program product may be distributed in the form of a machine-readable storage medium (e.g., a compact disc read-only memory (CD-ROM)), or be electronically distributed (e.g., downloaded or uploaded) via an application store or directly between two user devices (e.g., smartphones). When distributed online, at least a part of the computer program product (e.g., a downloadable application) may be temporarily generated or at least temporarily stored in a machine-readable storage medium, such as a memory of a server of a manufacturer, a server of an application store, or a relay server.

While embodiments have been particularly shown and described, it will be understood by one of ordinary skill in the art that various changes in form and details may be made therein without departing from the scope as defined by the following claims.

The invention claimed is:

1. A method of reconstructing an optical flow by using artificial intelligence (AI), the method comprising:

obtaining, from a bitstream, feature data of a current residual optical flow for a current image;

obtaining the current residual optical flow by applying the feature data of the current residual optical flow to a neural-network-based first decoder;

obtaining a second-order optical flow between a current predicted optical flow and a previous optical flow; and obtaining the current predicted optical flow by modifying the previous optical flow according to the second-order optical flow; and reconstructing a current optical flow based on the current residual optical flow and the current predicted optical flow.

2. The method of claim 1, wherein the current image is reconstructed based on current residual image data and a current predicted image generated based on a previous reconstructed image and the reconstructed current optical flow.

3. The method of claim 1, wherein the obtaining of the second-order optical flow comprises:

obtaining the second-order optical flow by applying at least one of the previous optical flow, feature data of the previous optical flow, and feature data of a previous residual optical flow to a second prediction neural network.

4. The method of claim 1, wherein the obtaining of the second-order optical flow comprises:

obtaining, from the bitstream, feature data of the second-order optical flow;

obtaining the second-order optical flow by applying the feature data of the second-order optical flow to a neural-network-based third decoder.

5. The method of claim 1, wherein the feature data of the current residual optical flow is obtained by performing entropy decoding and inverse quantization on the bitstream.

6. The method of claim 1, wherein the neural-network-based first decoder is trained based on:
first loss information corresponding to a difference between a current training image and a current reconstructed training image related to the current training image; and
second loss information corresponding to entropy of the feature data of the current residual optical flow of the current training image.

7. The method of claim 1, wherein the feature data of the current residual optical flow is obtained from the bitstream based on the current image corresponding to a predictive (P) frame, and based on the P frame following another P frame.

8. The method of claim 7, wherein based on the P frame following an intra (I) frame, the method further comprises:
obtaining feature data of the current optical flow from the bitstream; and
reconstructing the current optical flow by applying the feature data of the current optical flow to a neural-network-based fourth decoder.

9. A non-transitory computer-readable recording medium having recorded thereon a program for executing the method of claim 1.

10. An apparatus for reconstructing an optical flow by using artificial intelligence (AI), the apparatus comprising:
at least one processor configured to implement:
a bitstream obtainer configured to obtain feature data of a current residual optical flow from a bitstream for a current image; and
a prediction decoder configured to:
obtain the current residual optical flow by applying the feature data of the current residual optical flow to a neural-network-based first decoder,
obtain a second-order optical flow between a current predicted optical flow and a previous optical flow,
obtain the current predicted optical flow by modifying the previous optical flow according to the second-order optical flow, and
reconstruct a current optical flow based on the current residual optical flow and the current predicted optical flow.

11. A method of encoding an optical flow by using artificial intelligence (AI), the method comprising:
obtaining a second-order optical flow between a current predicted optical flow and a previous optical flow;
obtaining the current predicted optical flow by modifying the previous optical flow according to the second-order optical flow;
obtaining feature data of a current residual optical flow by applying a current image, a previous reconstructed image, and the current predicted optical flow to a neural-network-based first encoder; and
generating a bitstream corresponding to the feature data of the current residual optical flow,
wherein the current residual optical flow corresponds to a difference between a current optical flow and the current predicted optical flow.

* * * * *